US011623539B1

(12) United States Patent
 Brady

(10) Patent No.: US 11,623,539 B1
(45) Date of Patent: Apr. 11, 2023

(54) COMPLIANT JOINT WITH THREE DEGREES OF FREEDOM

(71) Applicant: Amazon Technologies, Inc., Seattle, WA (US)

(72) Inventor: Matthew Anthony Brady, Boston, MA (US)

(73) Assignee: Amazon Technologies, Inc., Seattle, WA (US)

( * ) Notice: Subject to any disclaimer, the term of this patent is extended or adjusted under 35 U.S.C. 154(b) by 393 days.

(21) Appl. No.: 16/906,588

(22) Filed: Jun. 19, 2020

(51) Int. Cl.
| | |
|---|---|
| *B60L 53/36* | (2019.01) |
| *B60L 53/16* | (2019.01) |
| *H02J 7/00* | (2006.01) |
| *F16M 13/02* | (2006.01) |
| *G05D 1/02* | (2020.01) |
| *H01R 31/06* | (2006.01) |

(52) U.S. Cl.
CPC ............... *B60L 53/36* (2019.02); *B60L 53/16* (2019.02); *F16M 13/022* (2013.01); *G05D 1/0225* (2013.01); *H02J 7/0042* (2013.01); *H01R 31/06* (2013.01)

(58) Field of Classification Search
CPC ....... B60L 53/36; B60L 53/16; F16M 13/022; G05D 1/0225; H02J 7/0042; H01R 31/06

USPC ..................................................... 248/346.03
See application file for complete search history.

(56) References Cited

U.S. PATENT DOCUMENTS

| | | | | |
|---|---|---|---|---|
| 6,157,162 A | * | 12/2000 | Hayashi ................ | H02J 7/0042 320/104 |
| 2011/0101192 A1 | * | 5/2011 | Lee ....................... | F16M 13/022 248/346.03 |
| 2021/0198093 A1 | * | 7/2021 | Graham .................. | B60L 53/36 |

* cited by examiner

*Primary Examiner* — Paul Dinh
(74) *Attorney, Agent, or Firm* — Lee & Hayes, P.C.

(57) ABSTRACT

Disclosed herein is a compliant joint that is movable in three degrees of freedom (DOF), as well as systems including the compliant joint, and a process for assembling the compliant joint. The compliant joint may comprise an elongate arm, a ball joint, and a carrier. The ball joint is configured to couple to the carrier, and the elongate arm is configured to couple to the ball joint. The ball joint may have a cross section that is ellipsoidal, an outer surface that is convex, and a first hole. The carrier may comprise a second hole that is ellipsoidal, and an inner surface that is concave. The elongate arm, when disposed within the first hole, is movable axially through the first hole, and the ball joint, when disposed within the second hole, is movable with at least one of pitch rotation or yaw rotation.

16 Claims, 17 Drawing Sheets

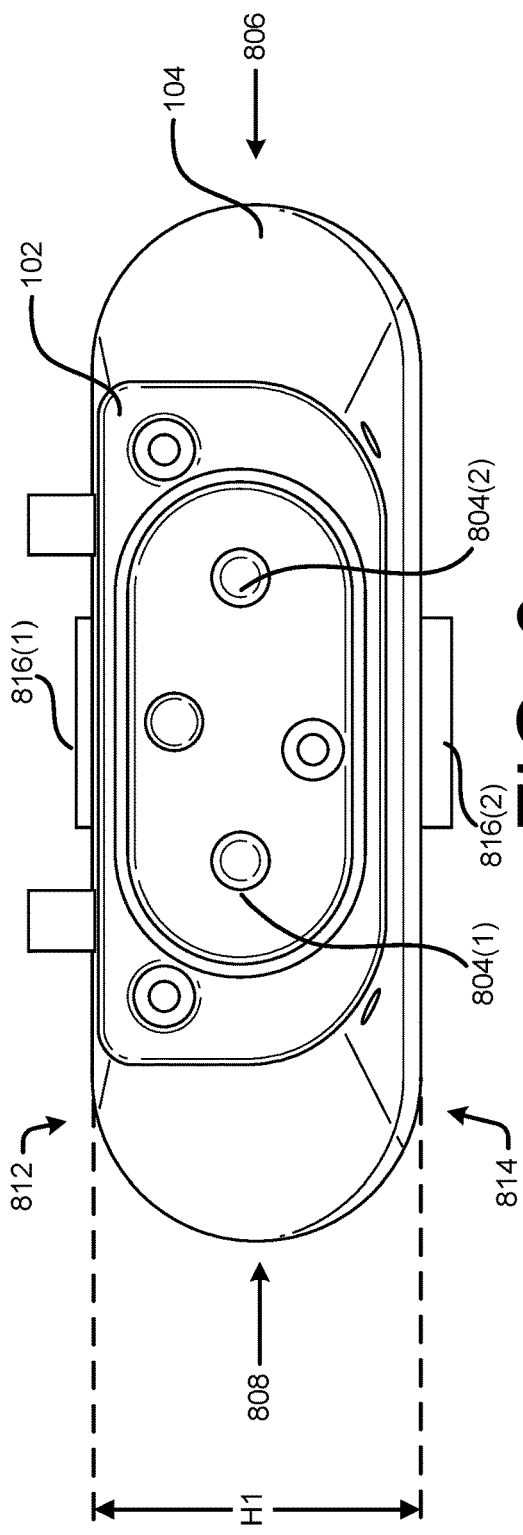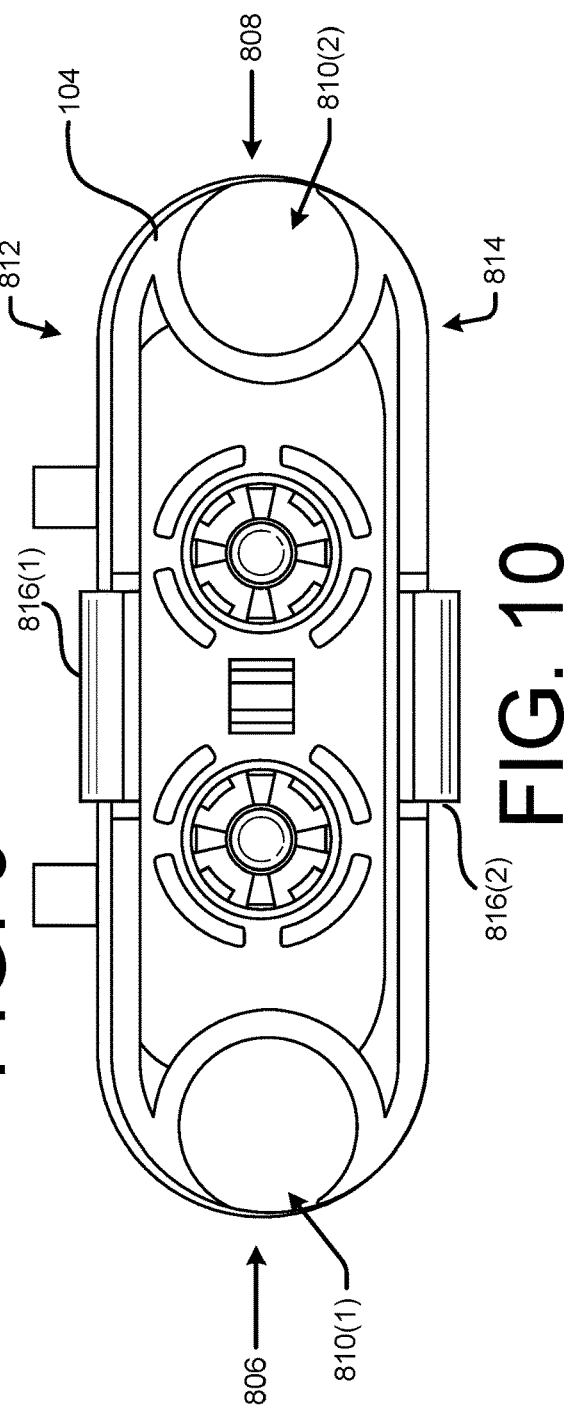

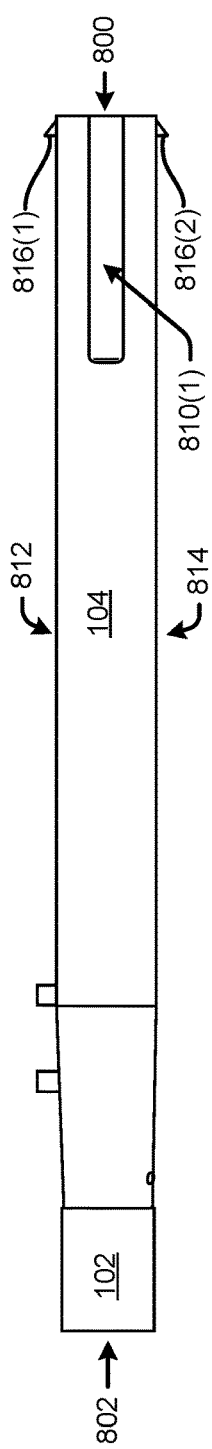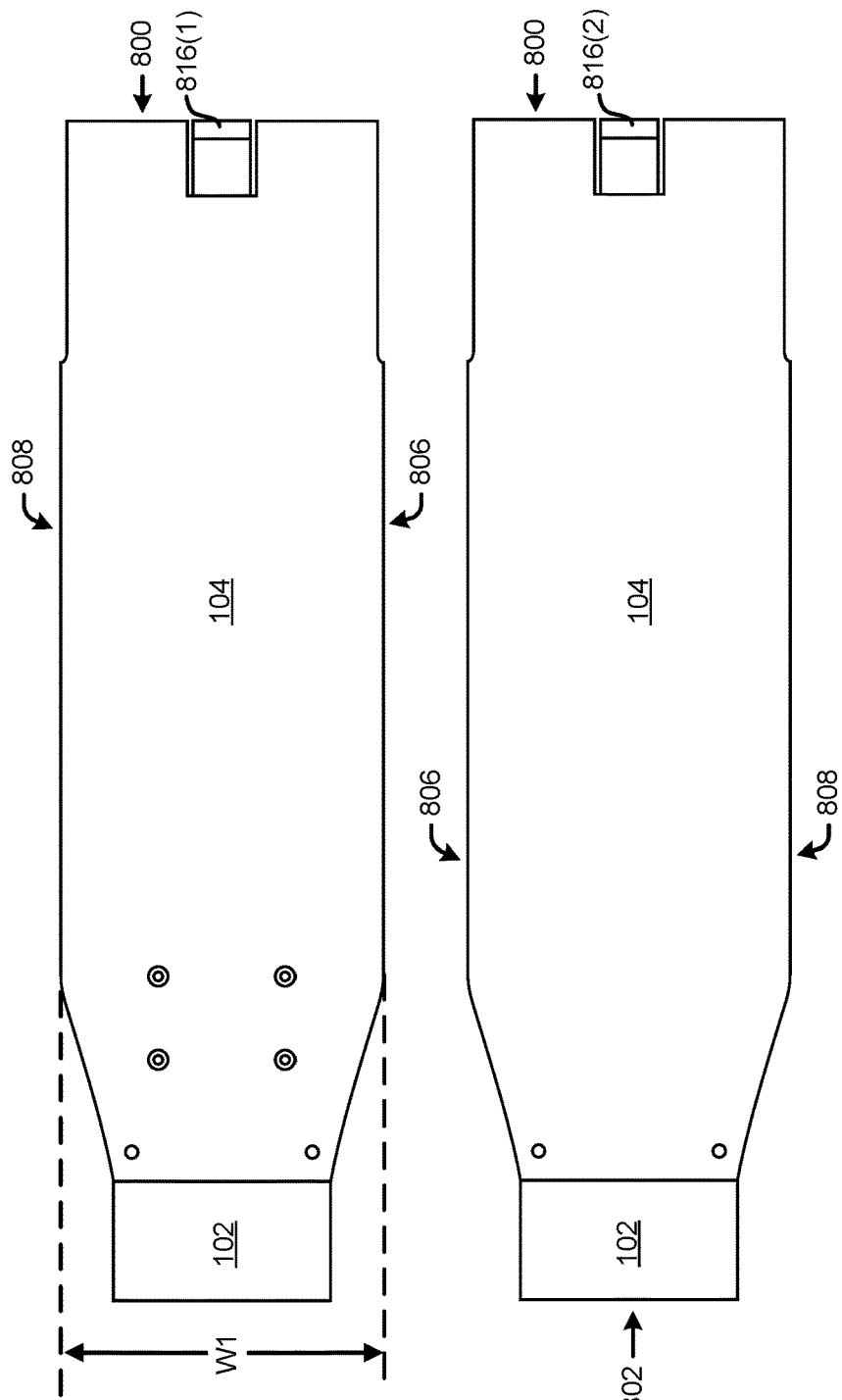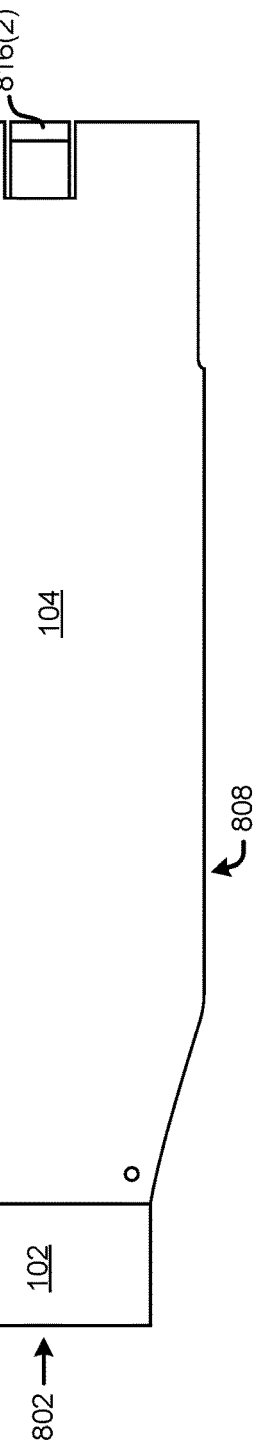

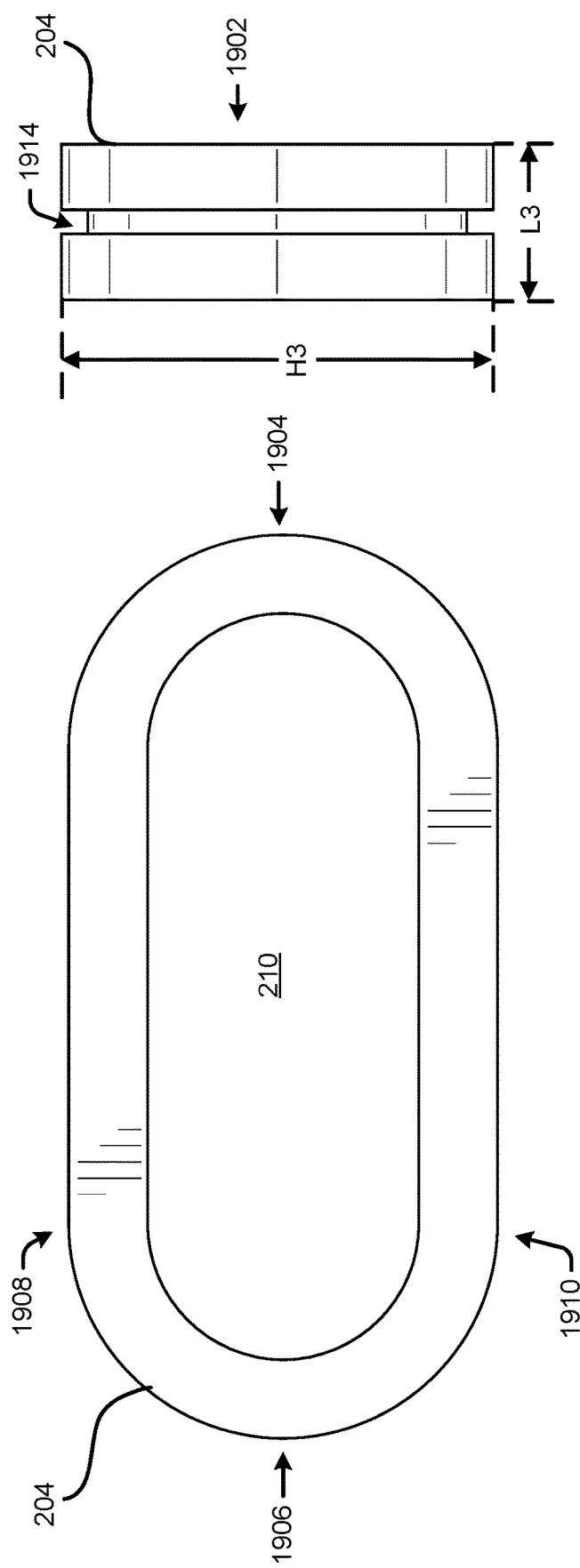
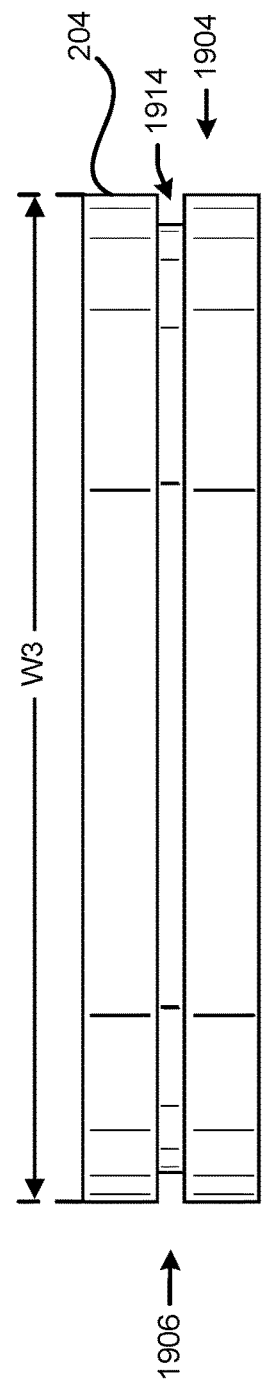

(SECTION A-A)

US 11,623,539 B1

COMPLIANT JOINT WITH THREE DEGREES OF FREEDOM

BACKGROUND

Autonomous robots (or drive units) are used in materials handling facilities to help automate certain tasks, such as transporting items within the facility, among other tasks. These autonomous robots are typically battery-powered in order to allow the robots to move freely about the facility. When a battery needs recharging, the robot is programmed to return to a charging station where the robot docks to recharge its battery between tasks.

Due to navigational imprecision of the robot's maneuvering capabilities, when a robot attempts to dock at a charging station, a charging port on the robot may be misaligned with respect to a corresponding charge adapter on the charging station. For example, the robot's charging port may be offset by an inch or more to the left or to the right of the charge adapter during a docking attempt. Such misaligned docking conditions may cause robots to dock at charging stations improperly, requiring manual intervention to correct the misalignment. For example, the robot may fail to establish a connection, may establish a poor electrical connection for recharging, and/or may lose the connection in the middle of charging. The robot may also cause breakage of components (e.g., on the robot, the charging station, or both) during a docking attempt, which is due in part to unintended collisions between rigidly-mounted components.

The disclosure made herein is presented with respect to these and other considerations.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 9 illustrates a front view of the example elongate arm of FIG. 8.

FIG. 10 illustrates a back view of the example elongate arm of FIG. 8.

FIG. 11 illustrates a side view of the example elongate arm of FIG. 8.

FIG. 12 illustrates a top view of the example elongate arm of FIG. 8.

FIG. 13 illustrates a bottom view of the example elongate arm of FIG. 8.

FIG. 20 illustrates a front view of the example carrier of FIG. 19.

FIG. 21 illustrates a side view of the example carrier of FIG. 19.

FIG. 22 illustrates a top view of the example carrier of FIG. 19.

DETAILED DESCRIPTION

Figure 1:
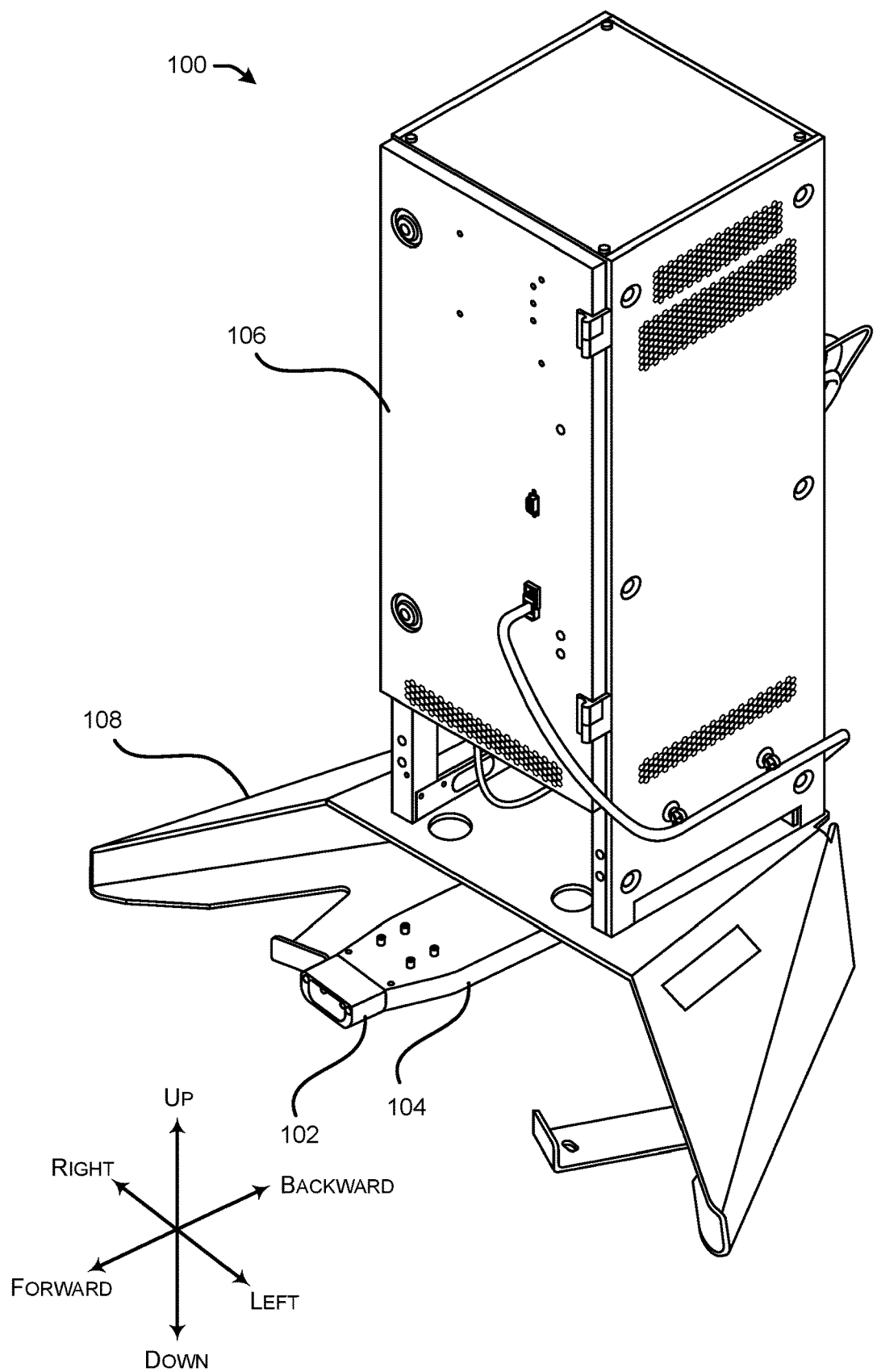
FIG. 1 illustrates a perspective view of an example charging station, the charging station having a charge adapter at a distal end of an elongate arm, the elongate arm being a component of an example joint assembly that is movable in three degrees of freedom (DOF), according to embodiments disclosed herein.

This disclosure describes, among other things, a compliant joint (or joint assembly) that is movable in three degrees of freedom (DOF), as well as systems including the compliant joint, and a process for assembling the compliant joint. The joint assembly may comprise an elongate arm, a ball joint, and a carrier. The ball joint may have a cross section that is ellipsoidal, an outer surface that is convex, and a first hole. The elongate arm may be configured to be disposed within the first hole of the ball joint, and may be configured to move axially through the first hole of the ball joint in response to an axial force applied to the elongate arm. The carrier may have a second hole that is ellipsoidal, and an inner surface that is concave. The ball joint may be configured to be disposed within the second hole of the carrier, and may be configured to move within the second hole of the carrier with pitch rotation and/or with yaw rotation in response to a transverse force applied to the elongate arm.

As mentioned, the joint assembly disclosed herein may be movable in three DOF. The axial movement of the elongate arm through the first hole of the ball joint may represent a first DOF. Pitch rotation of the ball joint within the second hole of the carrier may represent a second DOF. Yaw rotation of the ball joint within the second hole of the carrier may represent a third DOF. It is to be appreciated that rotation of the ball joint within the second hole of the carrier may be constrained to the pitch rotation and the yaw rotation, meaning that the ball joint is not rotatable with roll rotation. This constrained rotational movement is due, at least in part, to the ellipsoidal shape of the cross section of the ball joint, as well as the ellipsoidal shape of the second hole of the carrier in which the ball joint is disposed when the joint assembly is assembled. Furthermore, the translational movement of the elongate arm within the first hole of the ball joint may be constrained to forward and backward movement through the first hole, meaning that the elongate arm, despite being deflectable in up, down, left, and right directions, is not translatable in those directions at its proximal end.

An example process of assembling a compliant joint may comprise coupling a ball joint to a carrier, and coupling an elongate arm to the ball joint. The ball joint that is coupled to the carrier may have a cross section that is ellipsoidal, an outer surface that is convex, and a first hole. Meanwhile, the carrier may have a second hole that is ellipsoidal, and an inner surface that is concave. The ball joint, when coupled to the carrier, may be configured to move within the second hole with at least one of pitch rotation or yaw rotation, and the elongate arm, when coupled to the ball joint, may be configured to move axially through the first hole.

The ability of the joint assembly to move in three DOF, as disclosed herein, makes the joint assembly a compliant mechanical device that moves in response to external force applied to the elongate arm of the joint assembly. Accordingly, the compliant joint disclosed herein may be used in a wide variety of applications where positional compliance is beneficial. One example application where the compliant joint may be used is on a charging station where a battery-powered device (e.g., an autonomous robot, or drive unit) is configured to dock. As an illustrative example, a battery-powered, autonomous drive unit may operate within a facility, such as a fulfillment center, to transport items about the facility. The autonomous drive unit may be configured to move itself to a designated area within the facility (e.g., a location near a wall) to autonomously dock at a charging station to recharge the battery of the drive unit. The compliant joint disclosed herein may be part of the charging station where the autonomous drive unit is configured to dock. In this illustrative example, the elongate arm of the compliant joint may have a charge adapter disposed at the distal end of the elongate arm. The charge adapter may be configured to mate with a charging port on the drive unit. The charge adapter may have either male pins or female sockets that are configured to mate with the opposite gender connector (e.g., plug, port, recharge cartridge, etc.) on the drive unit. Electrical wiring of the charging station may connect a power source to the charge adapter on the elongate arm for purposes of charging the battery of the drive unit when the drive unit is docked at the charging station and properly coupled to the charge adapter.

In this illustrative battery-charging application, the compliant nature of the joint assembly on the charging station may compensate for a degree of misalignment when a drive unit docks at the charging station. If, for instance, the autonomous drive unit misaligns the charging port on the drive unit to the left or to the right of the charge adapter on the elongate arm, or if the height of the charging port is not in perfect vertical alignment with the charge adapter, the elongate arm may deflect to facilitate a proper engagement of the charging port and the charge adapter. The elongate arm may also compress axially during the docking process to facilitate this proper engagement of the charging port and the charge adapter. In this manner, autonomous docking at charging stations is enabled, and the integrity of electrical connections is improved while mitigating breakage of components (e.g., on the robot, the charging station, or both). It is to be appreciated that, instead of the compliant joint being part of the charging station, the compliant joint may be part of the autonomous drive unit to provide similar positional compliance.

Another example application where the compliant joint may be used is on a robotic arm that is configured to grasp and manipulate items, such as items moving past the robotic arm on a conveyor belt. For example, an end-of-arm tool on the robotic arm may benefit from having positional compliance, including axial compliance and rotational compliance (e.g., pitch and yaw), so that the end-of-arm tool does not damage sensors or other mechanisms, either on the robotic arm itself or on the items that the robotic arm is grasping and/or manipulating, or both. This positional compliance in the end-of-arm tool may be beneficial because the items (e.g., packages) that the robotic arm is attempting to grasp and/or manipulate are oftentimes misaligned with the end-of-arm tool during a grasping or manipulation maneuver. The compliant joint disclosed herein may be part of this end-of-arm tool to provide positional compliance, and the compliant joint may thereby compensate for a degree of misalignment between an item being grasped and the end-of-arm tool at the distal end of the robotic arm.

Yet another example application where the compliant joint may be used is on a vehicle suspension system. For example, the compliant joint disclosed herein may be part of a suspension system on a vehicle, such as a car, a motorcycle, a plane, or the like, and the joint may allow for movement between parts of the suspension system to provide axial and/or rotational compliance between the moving parts.

The disclosed joint assembly has a simplified design, as compared to known overly-complex designs of existing joint assemblies. For example, the individual components of the joint assembly, including the elongate arm, the ball joint, and the carrier, may be manufacturable as a single monolithic piece/part. Thereafter the components may be coupled together during assembly of the compliant joint without the need for fasteners. In one example, individual components of the joint assembly, including the elongate arm, the ball joint, and the carrier, can be injection molded independently. In this manner, the ball joint, for instance, may couple to the carrier without the need to manufacture the carrier as two separate pieces that are joined together around the ball joint.

The ellipsoidal (or ovoid) shape of component parts and/or features (e.g., holes) thereof may prevent roll rotation of the component parts of the joint assembly. As a result, rotational movement is constrained to pitch rotation and yaw rotation. This constrained rotational movement may be beneficial in battery-charging applications in part because a particular orientation of the pins (or sockets) of the charge adapter on the elongate arm may be maintained in order to correctly mate with the corresponding charging port/adapter on the drive unit (or on the charging station, as the case may be). Likewise, in a robotic arm implementation (e.g., when the joint assembly is part of an end-of-arm tool), the constrained rotational movement of the compliant joint described herein may be beneficial to prevent the end-of-arm tool from turning upside down, or otherwise changing its orientation in a way that is undesired. Regardless of the particular application, the joint assembly disclosed herein effectively isolates certain DOF without an overly complex design.

The compliant joint disclosed herein may further increase the lifespan of component parts that interact with, or are coupled to, the compliant joint. For example, when the compliant joint is implemented on a charging station, the compliant nature of the joint may absorb impacts to reduce the wear and tear on component parts of an associated system. This reduced wear and tear may translate into infrequent maintenance and/or infrequent replacement of parts.

In battery-charging applications, the compliant joint described herein can allow an autonomous electronic device (e.g., an autonomous drive unit) to dock properly, establish an electrical connection for recharging, and maintain the electrical connection throughout charging. The compliant joint may also prevent damage (e.g., breakage) of component parts of the system during the docking procedure. The positional compliance of the joint compensates for any existing navigational imprecision in autonomous drive units without requiring any re-design of the navigational software and/or hardware that controls the movement of the drive units.

While the joint assembly is described herein by way of example as being a part of a charging station used for charging battery-powered, autonomous electronic devices docked at the charging station, it is to be appreciated that the joint assembly may be implemented in various scenarios and across a wide variety of applications where positional compliance may be beneficial. Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a perspective view of an example charging station 100. The charging station 100 is shown as having a charge adapter 102 at a distal end of an elongate arm 104. The elongate arm 104 is a component of a compliant joint (or joint assembly) that is movable in three degrees of freedom (DOF). Accordingly, a battery-powered, autonomous drive unit (e.g., an autonomous robot) may dock at the charging station 100 by aligning a charging port on the drive unit with the charge adapter 102, and subsequently moving the driving unit towards the charging station 100 until the charging port on the drive unit is engaged with, and coupled to, the charge adapter 102 of the charging station 100. For example, the charge adapter 102 may have one or more male pins that are configured to mate with one or more female sockets of the charging port on the autonomous drive unit. Alternatively, the charge adapter 102 may have one or more female sockets that are configured to mate with one or more male pins of the charging port on the autonomous drive unit. Once the charge adapter 102 is plugged into the charging port of the drive unit, an electrical connection is established to recharge the battery of the autonomous drive unit while the electrical connection is maintained. A housing 106 of the charging station 100 may include various components, including, without limitation, a power source and/or a power converter (e.g., an alternating current (AC)-to-direct current (DC) converter), a power inverter, an amplifier, etc., which may be coupled to the charge adapter 102 via electrical wiring of the charging station 100.

As will be appreciated by the description of the following figures (e.g., FIGS. 2-24), the compliant nature of the joint assembly (on which the charge adapter 102 is disposed) may, during a docking procedure, compensate for a degree of misalignment between the charging port on a drive unit and the charge adapter 102. If, for instance, the drive unit misaligns the charging port to the left or to the right of the charge adapter 102, and/or if the height of the charging port on the drive unit is not in vertical alignment with the charge adapter 102 during a docking procedure, the elongate arm 104 may compress and/or deflect in order to facilitate a proper engagement between the charging port on the drive unit and the charge adapter 102 on the charging station 100. For example, the elongate arm 104 may deflect in a horizontal direction (e.g., to the right or to the left, as shown in FIG. 1), and/or the elongate arm 104 may deflect in a vertical direction (e.g., up or down, as shown in FIG. 1). The deflection of the elongate arm 104 may redirect the movement of the drive unit slightly in order to facilitate a proper engagement of the charging port and the charge adapter 102 while mitigating damage (e.g., breakage) of components on the drive unit and/or on the charging station 100. The elongate arm 104 may additionally, or alternatively, compress axially (e.g., backwards, as shown in FIG. 1) during the docking process to facilitate the proper engagement and mitigate damage to component parts. In this manner, autonomous docking at charging stations, such as the charging station 100, is enabled with the disclosed compliant joint, thereby reducing, if not eliminating, the need for manual intervention. Furthermore, the integrity of electrical connections may be improved, and/or damage to components may be mitigated during docking procedures.

The elongate arm 104 is shown as extending or projecting horizontally from a base frame 108 of the charging station 100. Mounting the joint assembly with the elongate arm 104 to the base frame 108 allows the charge adapter 102 to be at a suitable height for coupling with a charging port of an autonomous drive unit approaching the charging station 100, which may be a few inches above ground level. Accordingly, the orientation of the elongate arm 104 on the base frame 108 is a horizontal orientation where the longitudinal axis of the elongate arm 104 runs backward-to-forward, or vice versa, as shown in FIG. 1. This orientation of the longitudinal axis of the elongate arm 104 may be considered the Z-direction, using Cartesian coordinates. The distal end of the elongate arm 104 may project from the base frame 108 to provide ample clearance and access to the charge adapter 102 so that autonomous drive units can readily move into engagement with the distal end of the elongate arm 104 where the charge adapter 102 is disposed. The housing 106 of the charging station 100 may be mounted atop the base frame 108, as shown in FIG. 1. The housing 106 may be a rectangular enclosure that houses various electrical and mechanical components. A person of ordinary skill in the art will readily appreciate the components that may be housed within the housing 106 of the charging station 100 to enable recharging of batteries on battery-powered devices that are configured to dock at the charging station 100. The base frame 108 and the housing 106 may be made of any suitable material including, without limitation, sheet metal, or any other suitably rigid, or semi-rigid, material.

Figure 2:
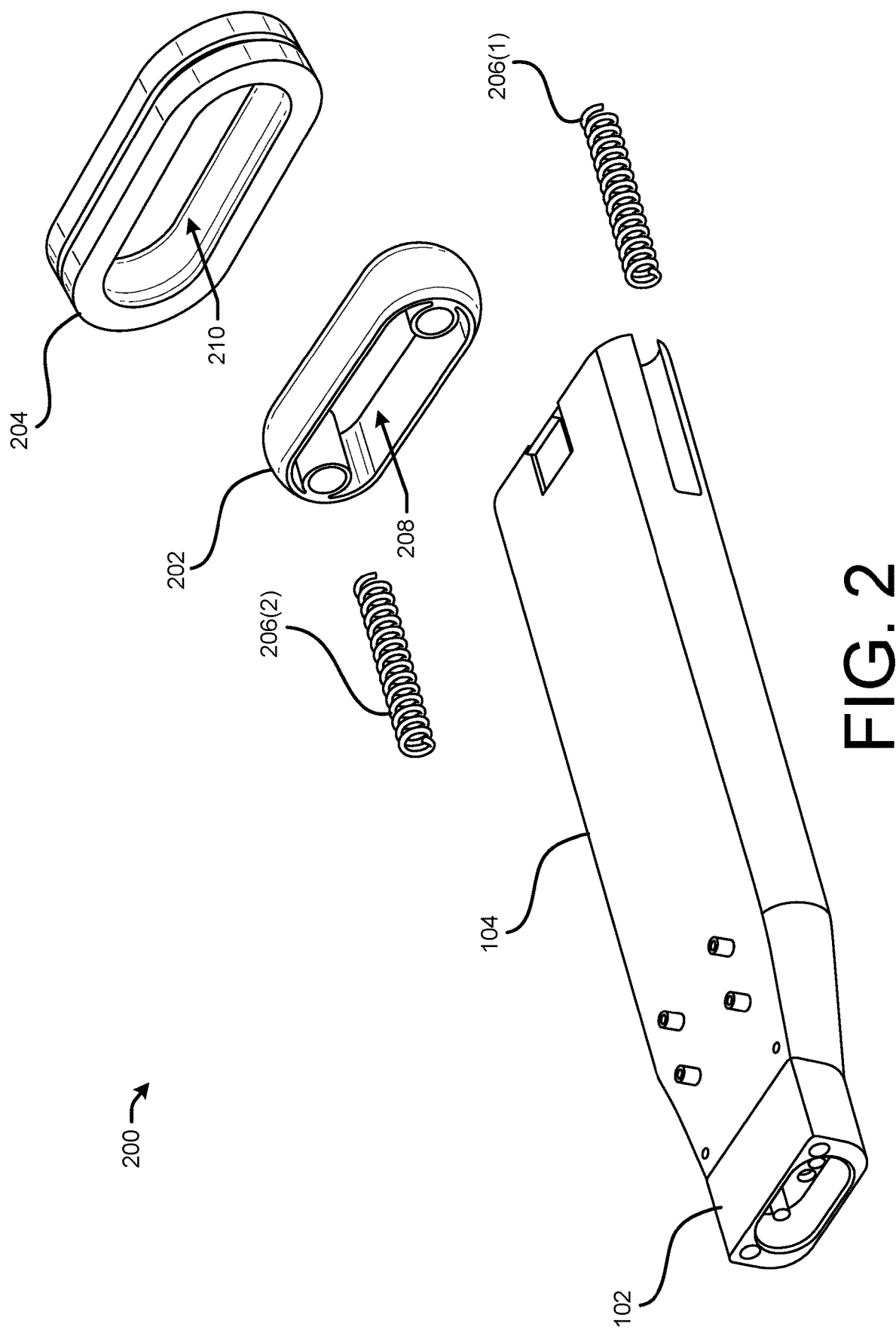
FIG. 2 illustrates a perspective exploded view of an example joint assembly that is movable in three DOF, according to embodiments disclosed herein.

FIG. 2 illustrates a perspective exploded view of an example joint assembly 200 (sometimes referred to herein as a "system 200," "compliant joint 200," or simply "joint 200") that is movable in three DOF. The compliant joint 200 may comprise the elongate arm 104 introduced in FIG. 1, as well as a ball joint 202, and a carrier 204. In some embodiments, the compliant joint 200 may further comprise a pair of biasing members 206(1) and 206(2), such as springs (e.g., compression springs), which are configured to bias the joint 200 into a resting position in the absence of any externally applied force(s). FIG. 2 also shows the elongate arm 104 with the charge adapter 102 disposed at a distal end of the elongate arm 104 for using the joint 200 in battery-charging applications. However, it is to be appreciated that the charge adapter 102 may be omitted from the joint 200 where the joint 200 is used in other applications besides battery-charging. FIG. 2 also shows that the ball joint 202 may have a first hole 208 defined therein, such as in the center of the ball joint 202. This first hole 208 may be a through-hole that passes all the way through the ball joint 202 from front-to-back, or vice versa, thereby providing respective openings in the front and the back of the ball joint 202, which, in turn, provides a passage through the ball joint 202. Similarly, FIG. 2 shows that the carrier 204 may have a second hole 210 defined therein, such as in the center of the carrier 204. This second hole 210 may be a through-hole that passes all the way through the carrier 204 from front-to-back, or vice versa, thereby providing openings in the front and the back of the carrier 204, which, in turn, provides a passage through the carrier 204. The first hole 208 and/or the second hole 210 may be ellipsoidal (or ovoid) in shape. The elongate arm 104, the ball joint 202, and/or the carrier 204 may have respective cross sections that are also ellipsoidal (or ovoid). These ellipsoidal cross sections/shapes constrain rotational movement of the ball joint 202 within the carrier 204 and the elongate arm 104 within the ball joint 202 to pitch rotation and yaw rotation, as will be described in further detail with reference to the following figures. Accordingly, the word "ball" in "ball joint 202" is not meant to imply a spherical shape. Rather, the ball joint 202 may not be spherical, and may, instead, have an ellipsoidal shape, as illustrated and described herein.

Figure 3:
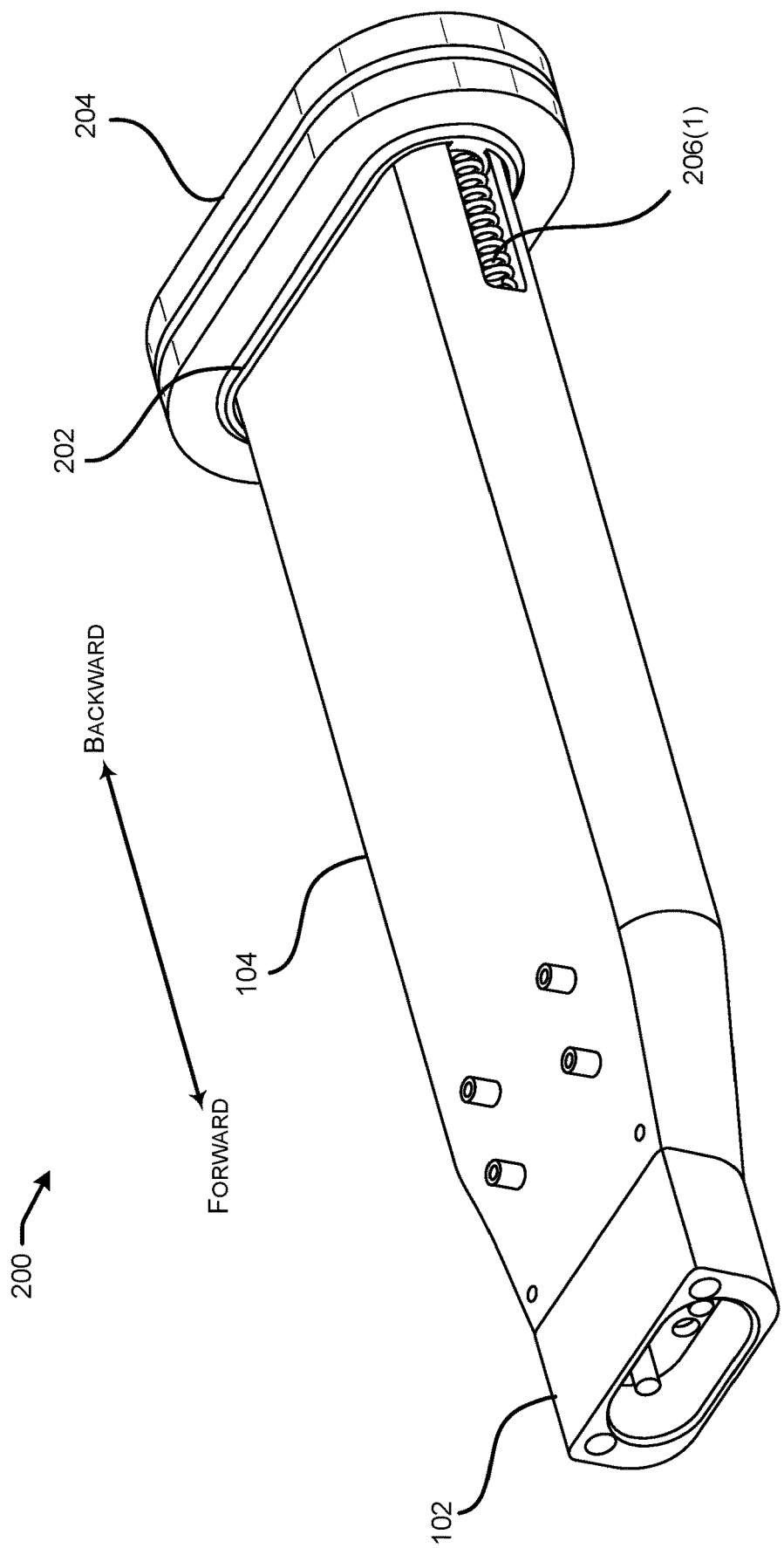
FIG. 3 illustrates a perspective assembled view of the example joint assembly of FIG. 2.

FIG. 3 illustrates a perspective assembled view of the example joint assembly 200 of FIG. 2. As shown in FIG. 3, the elongate arm 104 is disposed within the first hole 208 of the ball joint 202. Furthermore, the ball joint 202 is shown as being disposed within the second hole 210 of the carrier 204. The pair of biasing members 206(1) and 206(2) (the biasing member 206(2) is not visible in FIG. 3) may be disposed within respective grooves that are defined in the elongate arm 104. In this manner, each biasing member 206 may engage with (or couple to) a retention feature of the ball joint 202 at one end of the biasing member 206, and may abut the elongate arm 104 at the opposite end of the biasing member 206. In these positions, the biasing members 206 may, together, create a biasing force that biases (e.g., pushes) the elongate arm 104 in a forward direction relative to the ball joint 202. In this state, the elongate arm 104 is extended. The extended state of the elongate arm 104 may be considered to be a "resting position" of the elongate arm 104 and/or of the joint 200 in the absence of any external forces.

Figure 4:
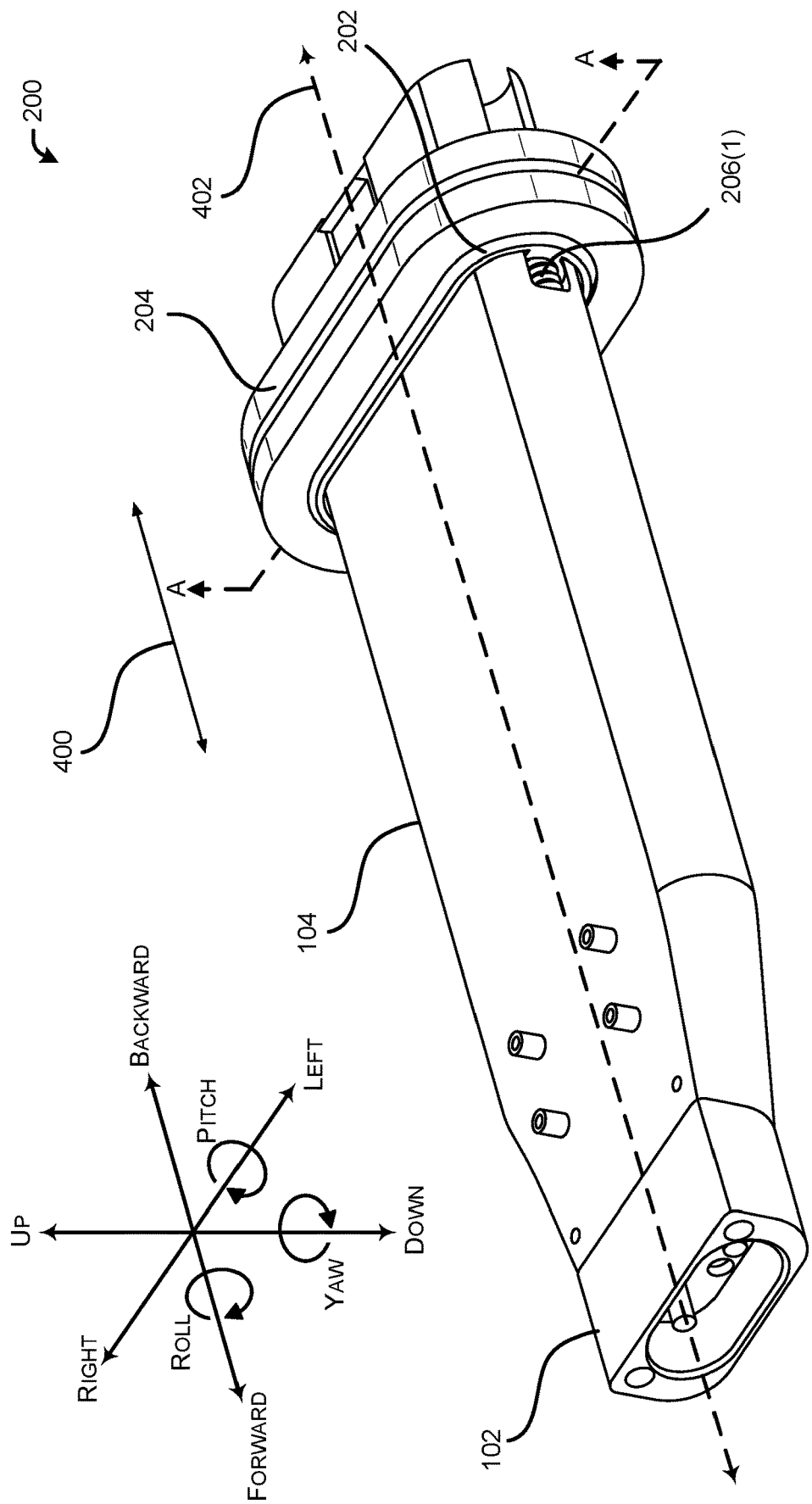
FIG. 4 illustrates a perspective view of the example joint assembly of FIG. 3, with the elongate arm in a compressed state to illustrate axial movement in a first DOF.

FIGS. 4-7 illustrates the manners in which the joint 200 is configured to move (i.e., three DOF). FIG. 4 illustrates a perspective view of the example compliant joint 200 of FIG. 3, but with the elongate arm 104 in a compressed state to illustrate axial movement 400 in a first DOF. For example, in response to an axial 400 force applied to the elongate arm 104 (i.e., a force directed along a longitudinal axis 402 of the elongate arm 104, forward-to-backward, or backward-to-forward), the elongate arm 104 may be configured to move axially 400 through the first hole 208 of the ball joint 202. FIG. 4 shows how the elongate arm 104 has moved axially 400 from an extended state to a compressed state by moving backward through the first hole 208 of the ball joint 202. In this state, the biasing members 206 are compressed.

Figure 5:
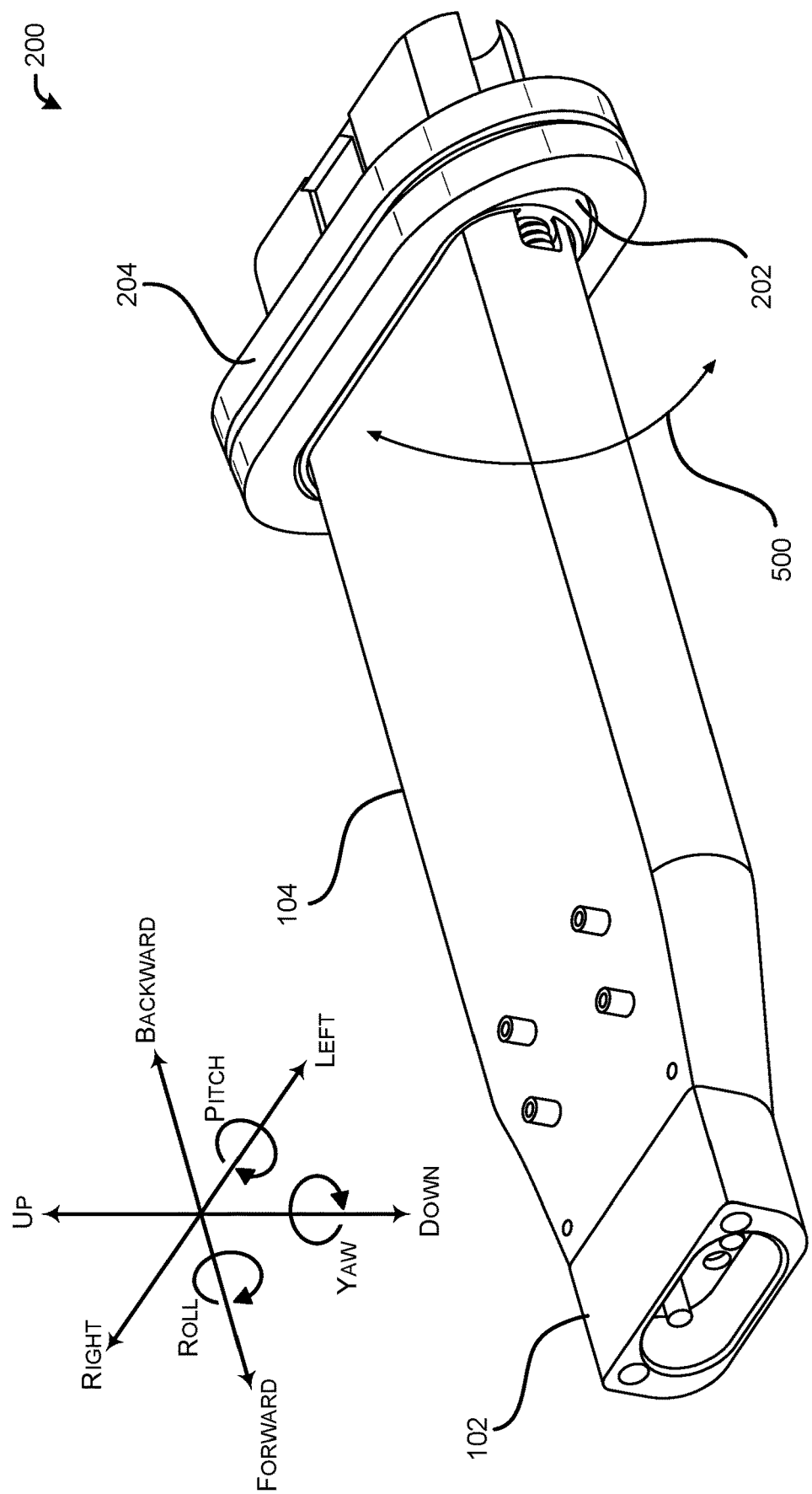
FIG. 5 illustrates a perspective view of the example joint assembly of FIG. 3, with the elongate arm in a compressed state and also deflected upward to illustrate pitch rotation in a second DOF.

FIG. 5 illustrates a perspective view of the example compliant joint 200 of FIG. 3, but with the elongate arm 104 in a compressed state and also deflected upward to illustrate pitch rotation 500 in a second DOF. For example, in response to a transverse force applied to the elongate arm 104 (i.e., a force directed, at least partially, vertically (e.g., up-to-down, or down-to-up)), the ball joint 202 may move within the second hole 210 of the carrier 204 with pitch rotation 500. FIG. 5 shows how this pitch rotation 500 causes the elongate arm 104 to deflect upward. In terms of Cartesian coordinates, if the X-axis runs from right-to-left or left-to-right, as shown in FIG. 5, then the pitch rotation 500 may be considered to be rotation about the X-axis running through the middle of the carrier 204.

Figure 6:
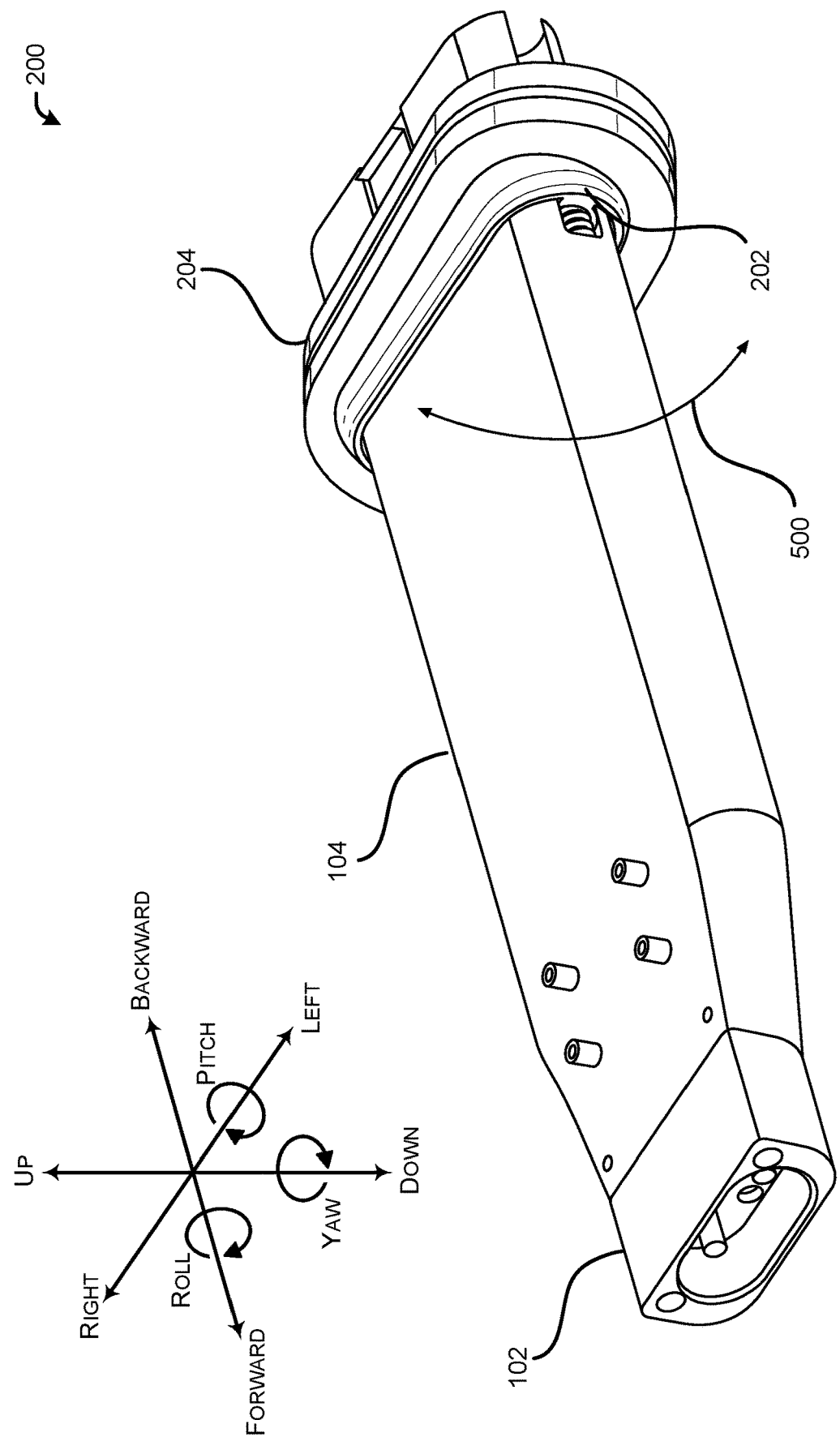
FIG. 6 illustrates a perspective view of the example joint assembly of FIG. 3, with the elongate arm in a compressed state and also deflected downward to illustrate the pitch rotation in the second DOF, but in the opposite direction to that shown in FIG. 5.

FIG. 6 illustrates a perspective view of the example compliant joint 200 of FIG. 3, but with the elongate arm 104 in a compressed state and also deflected downward to illustrate the pitch rotation 500 in the second DOF, but in the opposite direction with respect to FIG. 5. That is, where FIG. 5 illustrates the pitch rotation 500 of the ball joint 202 causing the elongate arm 104 to deflect upward, FIG. 6, by contrast, illustrates how pitch rotation 500 of the ball joint 202 in the opposite direction causes the elongate arm 104 to deflect downward. Because the ball joint 202 is movable with pitch rotation 500 within the carrier 204, this pitch rotation 500 may cause the ball joint 202 and the elongate arm 104 to move relative to the carrier 204. When the carrier 204 is mounted to a structure, such as the base frame 108 of the charging station 100 depicted in FIG. 1, the carrier 204 may remain substantially motionless while the ball joint 202 moves within, and relative to, the carrier 204. Because the elongate arm 104 is coupled to the ball joint 202, the deflection of the elongate arm 104 causes the rotation of the ball joint 202.

Figure 7:
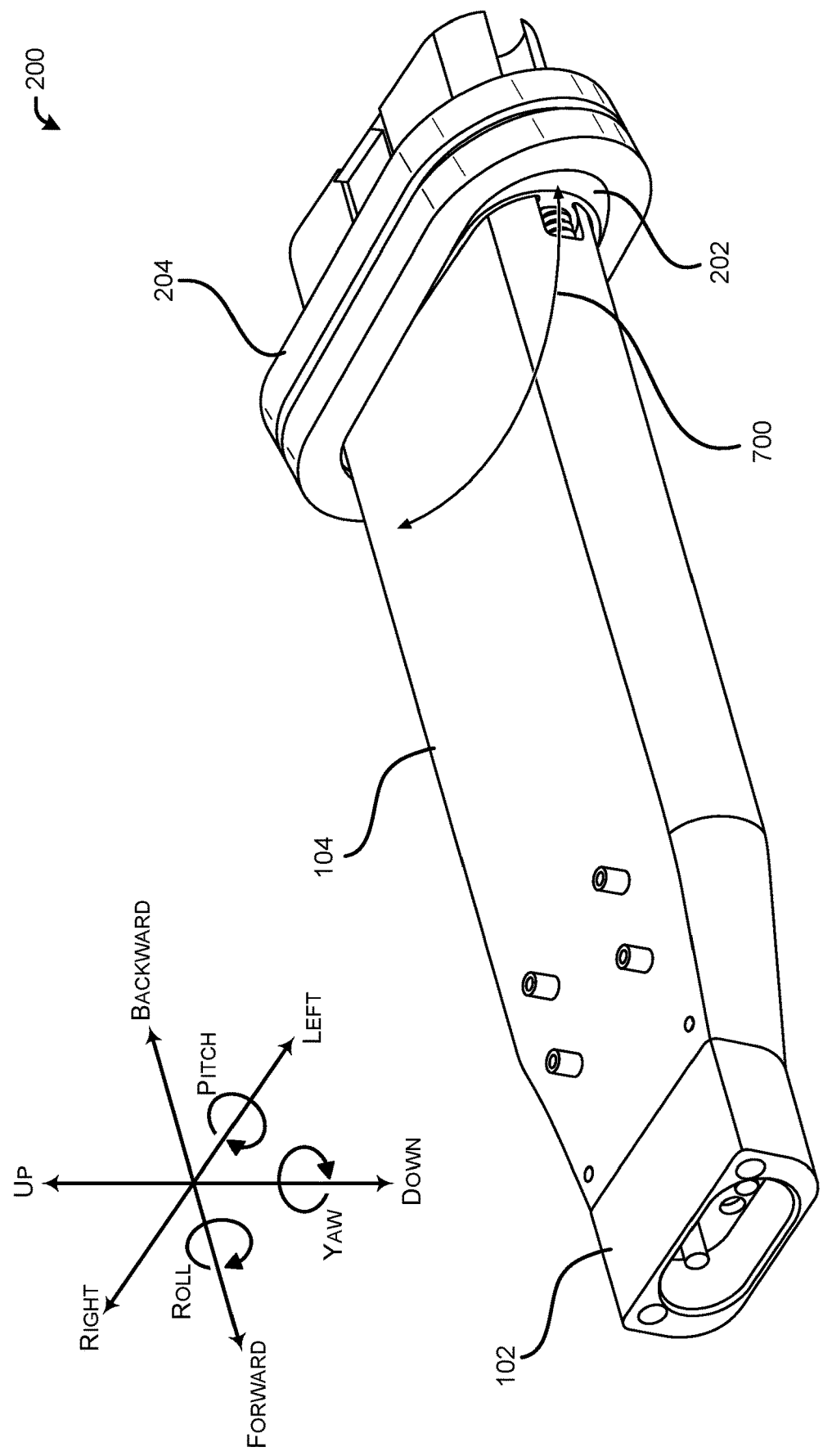
FIG. 7 illustrates a perspective view of the example joint assembly of FIG. 3, with the elongate arm in a compressed state and also deflected horizontally to illustrate yaw rotation in a third DOF.

FIG. 7 illustrates a perspective view of the example compliant joint 200 of FIG. 3, but with the elongate arm 104 in a compressed state and also deflected horizontally (or sideways) to illustrate yaw rotation 700 in a third DOF. For example, in response to a transverse force applied to the elongate arm 104 (i.e., a force directed, at least partially, horizontally (e.g., right-to-left, or left-to-right)), the ball joint 202 may be configured to move within the second hole 210 of the carrier 204 with yaw rotation 700. FIG. 7 shows how this yaw rotation 700 causes the elongate arm 104 to deflect rightward, but it is to be appreciated that an oppositely-directed transverse force would cause the elongate arm 104 to deflect leftward when the ball joint 202 moves with yaw rotation 700 in the opposite direction to that shown in FIG. 7. In terms of Cartesian coordinates, if the Y-axis runs from up-to-down or down-to-up, as shown in FIG. 7, then the yaw rotation 700 may be considered to be rotation about the Y-axis running through the middle of the carrier 204.

Figure 8:
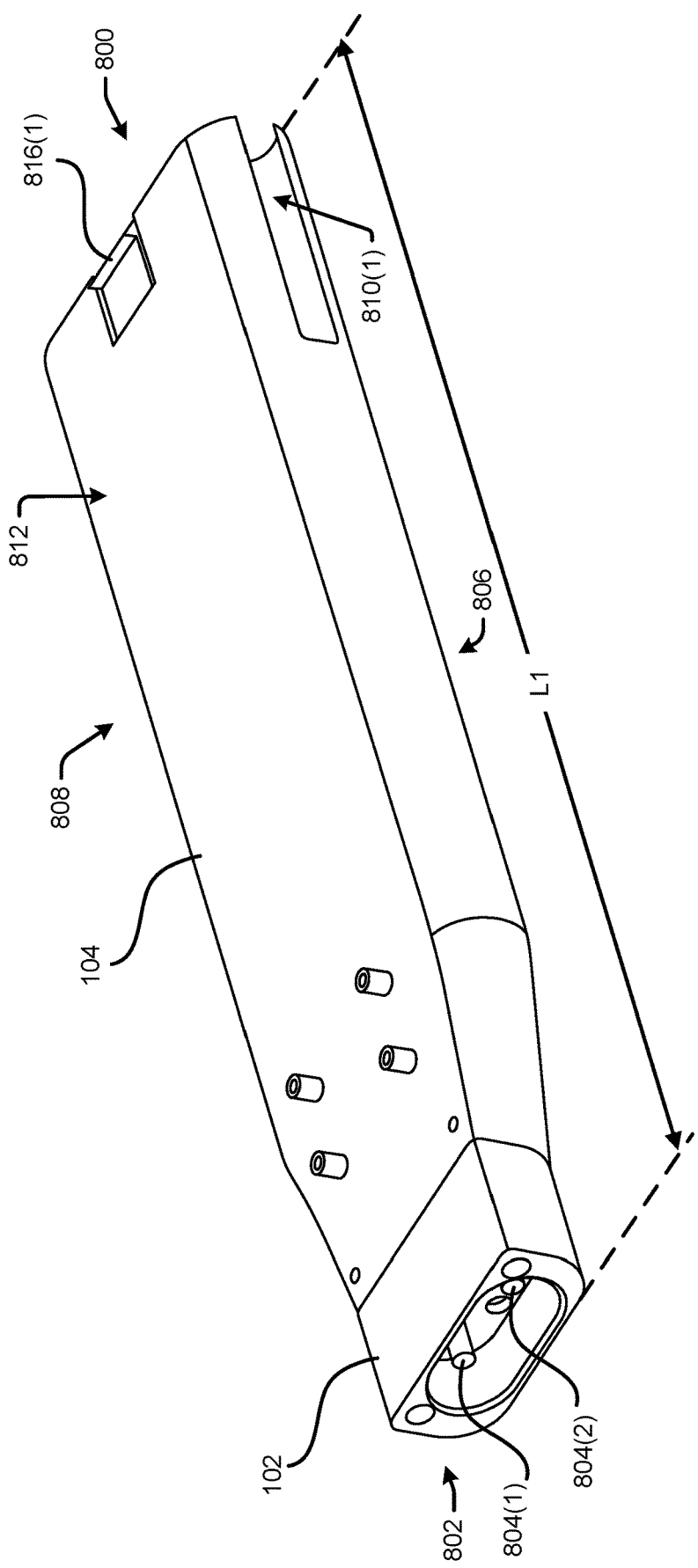
FIG. 8 illustrates a perspective view of the example elongate arm of the example joint assembly of FIG. 2.

FIG. 8 illustrates a perspective view of an example elongate arm 104 of the example compliant joint 200 of FIG. 2. FIG. 9 illustrates a front view of the example elongate arm 104 of FIG. 8, FIG. 10 illustrates a back view of the example elongate arm 104 of FIG. 8, FIG. 11 illustrates a side view of the example elongate arm 104 of FIG. 8, FIG. 12 illustrates a top view of the example elongate arm 104 of FIG. 8, and FIG. 13 illustrates a bottom view of the example elongate arm 104 of FIG. 8.

The elongate arm 104 has a proximal end 800 and a distal end 802. The proximal end 800 is configured to be inserted into the first hole 208 of the ball joint 202 in order to couple the elongate arm 104 to the ball joint 202. A charge adapter 102 may be disposed at the distal end 802. As described herein, the charge adapter 102 may be used for charging an autonomous electronic device, such as an autonomous drive unit. For example, the charge adapter 102 may include one or more male pins 804, such as the pair of male pins 804(1) and 804(2) shown in FIG. 8, which are insertable into female sockets of a corresponding charging port of a battery-powered electronic device, such as an autonomous drive unit. Alternatively, the charge adapter 102 may include female sockets that are configured to receive male pins of a corresponding charging port/adapter of a battery-powered electronic device. Electrical wiring may be connected to the male pins 804 (or female sockets) of the charge adapter 102 to deliver power via the charge adapter 102. This electrical wiring may run through an internal conduit(s) defined in the elongate arm 104 and may exit the elongate arm 104 through an opening at the proximal end 800.

The elongate arm 104 has a first side 806 and a second side 808. A first groove 810(1) may be defined in the first side 806, such as in a portion of the first side 806, and in a first portion of the proximal end 800. A second groove 810(2) may be defined in the second side 808, such as in a portion of the second side 808, and in a second portion of the proximal end 800. Each of the first groove 810(1) and the second groove 810(2) may be cylindrical in shape to accommodate a cylindrically-shaped biasing member 206 (e.g., a compression spring) that is sized to fit within the groove 810. Each of the first groove 810(1) and the second groove 810(2) may be defined in a portion of the first side 806 and a portion of the second side 808, respectively, such that the length of the groove 810 along the longitudinal axis 402 of the elongate arm 104 spans less than half of the overall length, L1, of the elongate arm 104 (including the charge adapter 102 at the distal end 802). The length of an individual groove 810 may be chosen for the desired axial compliance of the elongate arm 104 in the joint assembly 200. That is, the longer the groove 810 (and the longer the biasing member 206 inside the groove 810) the greater the extent to which the elongate arm 104 can pass through the ball joint 202, which means that the elongate arm 104 can be compressed to a greater degree (or distance), as compared to a relatively short groove 810. The first groove 810(1) may create an opening in the first side 806 and the second groove 810(2) may create an opening in the second side 808. These openings in the sides 806, 808 may have a height that is less than a diameter of a cylindrical-shaped biasing member 206 (e.g., a compression spring) disposed within the groove 810 such that the biasing member 206 is prevented from falling out of the groove 810 through the opening in the side 806, 808. Instead, a biasing member 206 may be inserted into a groove 810 through an opening created by the groove 810 in the proximal end 800 of the elongate arm 104, and the biasing member 206 may be retained within the groove 810 by an engagement of the biasing member 206 with a retention feature of the ball joint 202.

The elongate arm 104 has a top 812 and a bottom 814. A first tab 816(1) may be disposed on the top 812 at the proximal end 800. A second tab 816(2) may be disposed on the bottom 814 at the proximal end 800. Each of the first tab 816(1) and the second tab 816(2) may include a projection extending away from the elongate arm 104. For example, the first tab 816(1) may include a projection extending in the upward direction from the top 812, and the second tab 816(2) may include a projection extending in the downward direction from the bottom 814. Each of the first tab 816(1) and the second tab 816(2) may be resilient and bendable in a vertical direction. For example, the first tab 816(1) may be resilient and bendable at least in the downward direction from the top 812 to the bottom 814, and the second tab 816(2) may be resilient and bendable at least in the upward direction from the bottom 814 to the top 812. In this manner, when the proximal end 800 of the elongate arm 104 is inserted into the first hole 208 of the ball joint 202, the top and bottom portions of the ball joint 202 may interfere with the projections on the tabs 816 and thereby cause the tabs 816 to deflect vertically inward toward a center of the elongate arm 104 (e.g., by deflecting the first tab 816(1) downward and by deflecting the second tab 816(2) upward) so that the elongate arm 104 passes through the first hole 208 of the ball joint 202. When the projections on the tabs 816 pass all the way through the first hole 208 and clear (i.e., pass beyond) the back edge of the ball joint 202, the tabs 816 are configured to spring back to their original position. In their original positions, and when the elongate arm 104 is biased in the extended state by the biasing members 206, the tabs 816 abut the back edge of the ball joint 202, thereby preventing the elongate arm 104 from being pulled back through the first hole 208 from backward-to-forward, which, in turn, locks the elongate arm 104 in a coupled engagement with the ball joint 202. The resilient and bendable characteristic of each tab 816 may be enabled by cutouts, or slits, on both sides of the tab 816 at the proximal end 800.

The elongate arm 104 may have a cross section that is ellipsoidal (or ovoid). It is to be appreciated, however, that the cross section may include any suitable polygonal cross-sectional shape, such as a triangular cross section, a square cross section, a rectangular cross section, a pentagonal cross-section, etc. The ellipsoidal shape of the elongate arm's 104 cross section may prevent the elongate arm 104 from rotating with roll rotation while disposed within the first hole 208 of the ball joint 202. The elongate arm 104 may be substantially solid, the elongate arm 104 may be substantially hollow, or some combination (e.g., one or more cavities, conduits, or compartments may be defined within the elongate arm 104). Along the longitudinal axis 402 of the elongate arm 104, the elongate arm 104 may of a uniform dimension(s), or the elongate arm 104 may have at least some contour to its outer surface. The example elongate arm 104 illustrated in the figures is shown as being tapered near the distal end 802. In other words, at least a portion of the elongate arm 104 near the proximal end 800 may have a constant width, W1, and/or a constant height, H1, along at least a portion of a length, L1, of the elongate arm 104, and the width, W1, and/or the height, H1, of the elongate arm 104 may taper near the distal end 802 to a thinner width less than W1 and/or a shorter height less than H1. The width, W1, of the elongate arm 104 is shown in FIG. 12, and the height, H1, of the elongate arm 104 is shown in FIG. 9. The tapered distal end 802 of the elongate arm 104 may facilitate engaging with an autonomous electronic device, such as a drive unit.

FIG. 8 further shows the elongate arm 104 (with the charge adapter 102 disposed at the distal end 802) as having an overall length, L1. In some embodiments, the overall length, L1, of the elongate arm 104 (including the charge adapter 102 disposed at the distal end 802) is no greater than 25 inches, no greater than 20 inches, no greater than 15 inches, no greater than 10 inches, or no greater than 5 inches. In some embodiments, the overall length, L1, of the elongate arm 104 (including the charge adapter 102 disposed at the distal end 802) is at least 5 inches, at least 10 inches, at least 15 inches, at least 20 inches, or at least 25 inches. FIG. 12 shows the elongate arm 104 as having an overall width, W1. In some embodiments, the overall width, W1, of the elongate arm 104 is no greater than 10 inches, no greater than 8 inches, no greater than 6 inches, no greater than 4 inches, or no greater than 2 inches. In some embodiments, the overall width, W1, of the elongate arm 104 is at least 2 inches, at least 4 inches, at least 6 inches, at least 8 inches, or at least 10 inches. FIG. 9 shows the elongate arm 104 as having a height, H1—which does not include the projections extending from the tabs 816 or other projecting features of the elongate arm 104 shown in FIG. 9. In some embodiments, the height, H1, of the elongate arm 104 is no greater than 4 inches, no greater than 3 inches, no greater than 2 inches, no greater than 1 inch, or no greater than 0.5 inches. In some embodiments, the height, H1, of the elongate arm 104 is at least 0.5 inches, at least 1 inch, at least 2 inches, at least 3 inches, or at least 4 inches. These dimensions are merely exemplary, and it is to be appreciated that the elongate arm 104 can be scaled to any suitable size, depending on the application. The example dimensions of the elongate arm 104 may be suitable for battery-charging applications, such as where the joint assembly 200 (including the elongate arm 104) is part of a charging station 100, as shown in FIG. 1. It is to be appreciated that the longer (in terms of the length, L1) the elongate arm 104 is made, the less the ball joint 202 needs to rotate in order to span a desired range of movement at the distal end 802 of the elongate arm 104. Accordingly, the length, L1, of the elongate arm 104 may be chosen for the desired range of movement at the distal end 802 of the elongate arm 104 and/or the desired amount of pitch rotation and/or yaw rotation of the ball joint 202.

The elongate arm 104 may be made of any suitable material, combination of materials, or composite materials. For example, the elongate arm 104 can be made of plastic, such as acrylonitrile butadiene styrene (ABS) plastic, nylon, or any other suitable polymer material, such as a molded plastic polymer. In other embodiments, the elongate arm 104 can be made of metal, such as copper, aluminum, stainless steel, or any other suitable metallic material, or metallic coating on another type of base material. In general, any suitably rigid or semi-rigid material may be used to make the elongate arm 104.

In some embodiments, the elongate arm 104 may be manufactured using an injection molding technique, or an extrusion technique, the processes for which should be apparent to a person having ordinary skill in the art. By using an injection molding method to manufacture the elongate arm 104, minimal material is used for the manufacture of the elongate arm 104, thereby preventing excess waste of material. Other manufacturing techniques that may be used to manufacture the elongate arm 104 include machining a material into the shape of the elongate arm 104, or into component parts of the elongate arm 104 that are attached together during manufacture using any suitable fastening means, such as screws, pins, joints, adhesives, or the like. Any other subtractive manufacturing techniques can be used besides machining. Additionally, additive manufacturing techniques, such as 3D printing, can be used to manufacture the elongate arm 104.

Figure 14:
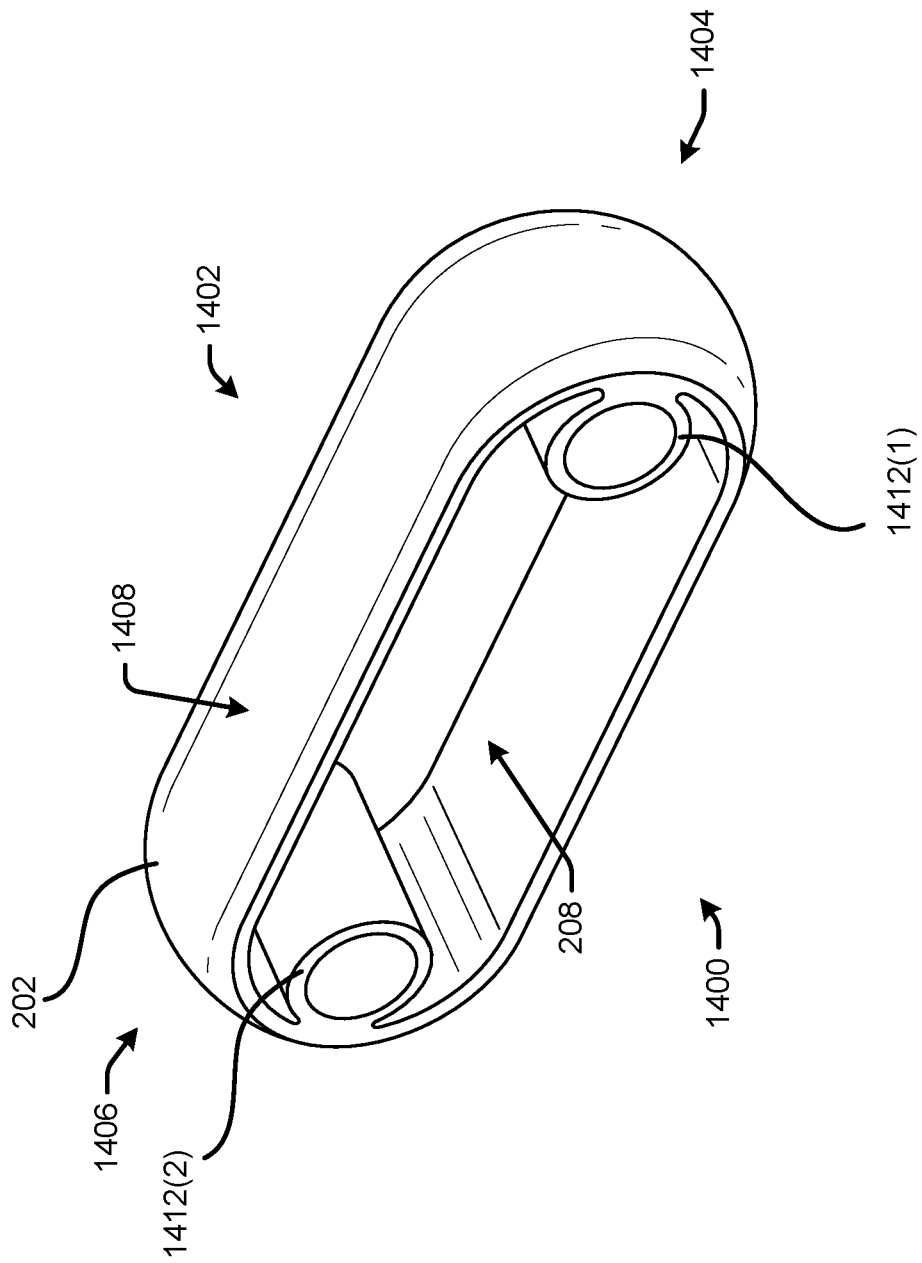
FIG. 14 illustrates a perspective view of an example ball joint of the example joint assembly of FIG. 2.
Figure 15:
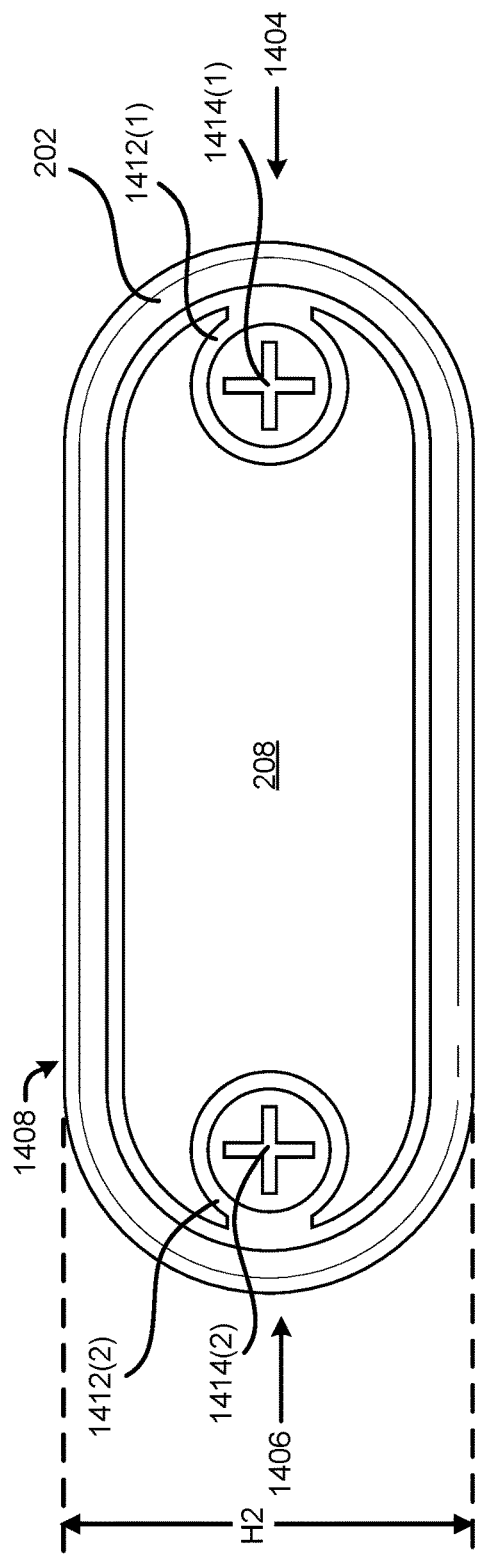
FIG. 15 illustrates a front view of the example ball joint of FIG. 14.
Figure 16:
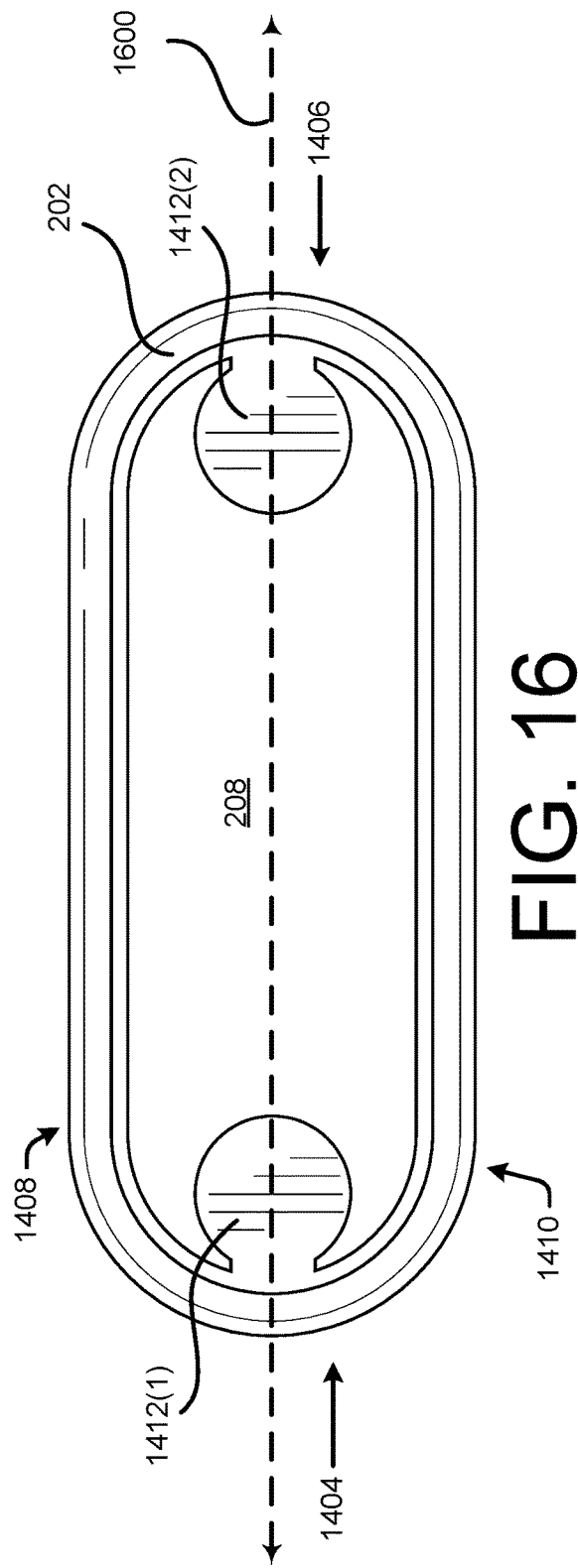
FIG. 16 illustrates a back view of the example ball joint of FIG. 14.
Figure 17:
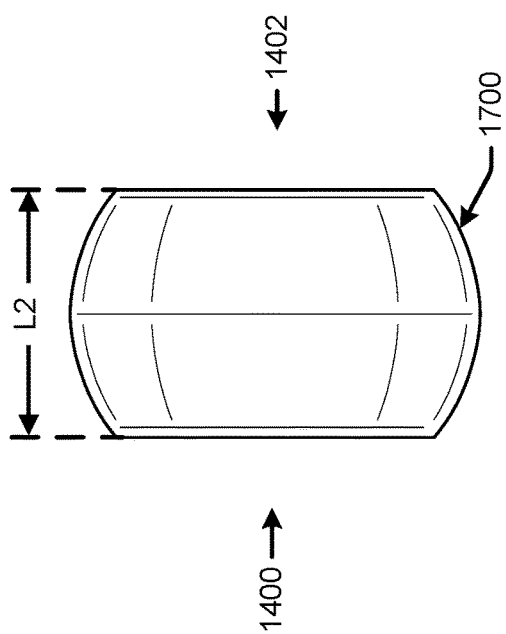
FIG. 17 illustrates a side view of the example ball joint of FIG. 14.
Figure 18:
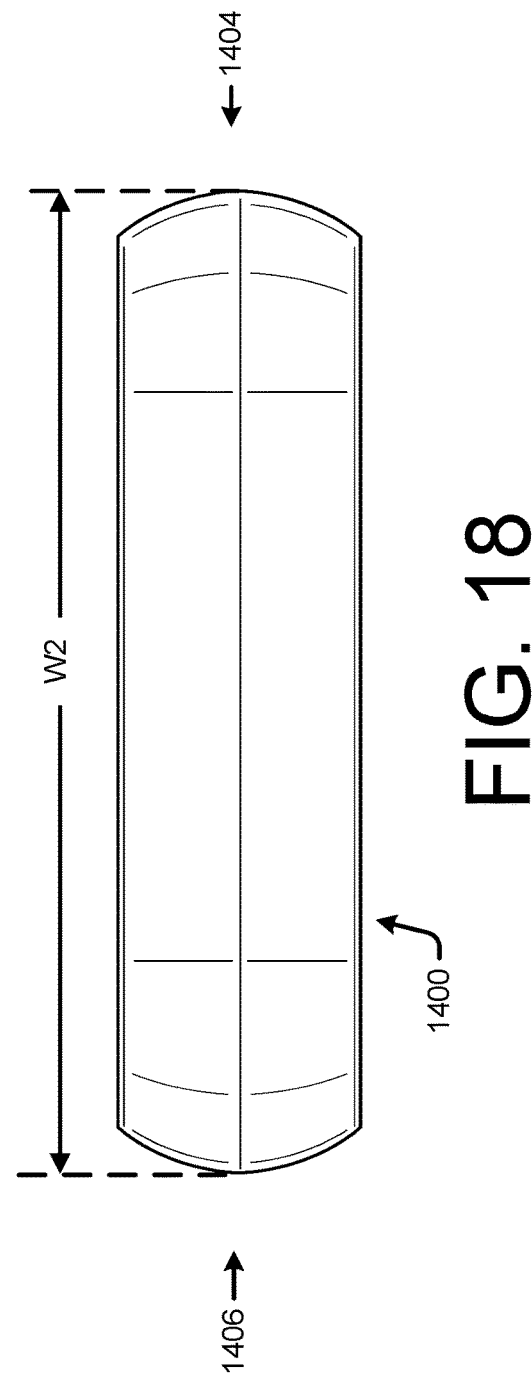
FIG. 18 illustrates a top view of the example ball joint of FIG. 14.

FIG. 14 illustrates a perspective view of an example ball joint 202 of the example joint assembly 200 of FIG. 2. The ball joint 202 is sometimes referred to herein as a "race 202" or a "guide 202" to denote a function of guiding the elongate arm 104 in axial movement 400 when the elongate arm 104 is disposed within the first hole 208 of the ball joint 202. The name "ball joint 202" denotes a function of rotating within the second hole 210 of the carrier 204 when the ball joint 202 is disposed within the second hole 210 of the carrier 204 and coupled thereto. FIG. 15 illustrates a front view of the example ball joint 202 of FIG. 14, FIG. 16 illustrates a back view of the example ball joint 202 of FIG. 14, FIG. 17 illustrates a side view of the example ball joint 202 of FIG. 14, and FIG. 18 illustrates a top view of the example ball joint 202 of FIG. 14.

The ball joint 202 has a front 1400, a back 1402, a first side 1404, a second side 1406, a top 1408, and a bottom 1410. The ball joint 202 has a first hole 208 that is configured to receive the elongate arm 104 to couple the elongate arm 104 to the ball joint 202. Accordingly, the shape of the first hole 208 may be similar to the shape of the cross section of the elongate arm 104 (or at least the portion of the elongate arm 104 at, or near, the proximal end 800 of the elongate arm 104). In some embodiments, the elongate arm 104 has a cross section that is ellipsoidal. Accordingly, the first hole 208 of the ball joint 202 may also be ellipsoidal, and sized to receive the elongate arm 104 therein. It is to be appreciated, however, that the first hole 208 may be of any suitable polygonal shape, such as triangular, square, rectangular, pentagonal, etc. The ellipsoidal shape of the first hole 208 may prevent the elongate arm 104 from rotating with roll rotation while disposed within the first hole 208 of the ball joint 202. The ball joint 202 itself may also have a cross section that is ellipsoidal.

The ball joint 202 may be substantially solid, the ball joint 202 may be substantially hollow, or some combination (e.g., one or more cavities, conduits, or compartments may be defined within the ball joint 202). The ball joint 202 may have an outer surface 1700 that is convex. The convex outer surface 1700 of the ball joint 202 is denoted in FIGS. 17 and 23, which shows the curvature of the convex outer surface 1700 as curving along a longitudinal axis from front-to-back, or back-to-front. This convex shape of the outer surface 1700 of the ball joint 202 allows the ball joint 202 to fit, and rotate or otherwise move with pitch rotation and yaw rotation, while the ball joint 202 is disposed within a second hole 210 of the carrier 204. The carrier 204 has a concave inner surface with a substantially equal radius of curvature to that of the outer surface 1700 of the ball joint in order to accommodate the convex outer surface 1700 of the ball joint 202.

The ball joint 202 may include one or more retention features 1412, such as a first retention feature 1412(1) and a second retention feature 1412(2). Each of the first retention feature 1412(1) and the second retention feature 1412(2) may extend into the first hole 208 from an inner surface of the ball joint 202. Each of the first retention feature 1412(1) and the second retention feature 1412(2) may be cylindrical in shape with a cylindrically-shaped recess or cavity defined therein to receive a cylindrically-shaped biasing member 206. When the ball joint 202 is disposed in the joint assembly 200 with the elongate arm 104 coupled thereto, the first retention feature 1412(1) is axially aligned with the first groove 810(1) of the elongate arm 104, and the second retention feature 1412(2) is axially aligned with the second groove 810(2) of the elongate arm 104. Each of the first retention feature 1412(1) and the second retention feature 1412(2) may include a cross (or cross-shaped) projection 1414 at a back of the cylindrical recess or cavity defined in the retention feature 1412. A biasing member 206, such as a compression spring, is configured to fit over (or around) the cross projection 1414 with a press fit or a snap fit in order to retain the biasing member 206 in the retention feature 1412 and thereby prevent the biasing member 206 from losing engagement with the retention feature 1412. The retention features 1412 may be positioned on the major (horizontal) axis 1600 of the ball joint 202, with the first retention feature 1412(1) positioned at the first side 1404 of the ball joint 202 and the second retention feature 1412(2) positioned at the second side 1406 of the ball joint 202.

FIG. 17 further shows the ball joint 202 as having an overall length, L2. In some embodiments, the overall length, L2, of the ball joint 202 is no greater than 4 inches, no greater than 3 inches, no greater than 2 inches, no greater than 1 inch, or no greater than 0.5 inches. In some embodiments, the overall length, L2, of the ball joint 202 is at least 0.5 inches, at least 1 inch, at least 2 inches, at least 3 inches, or at least 4 inches. FIG. 18 shows the ball joint 202 as having an overall width, W2. In some embodiments, the overall width, W2, of the ball joint 202 is no greater than 11 inches, no greater than 9 inches, no greater than 7 inches, no greater than 5 inches, or no greater than 3 inches. In some embodiments, the overall width, W2, of the ball joint 202 is at least 3 inches, at least 5 inches, at least 7 inches, at least 9 inches, or at least 11 inches. FIG. 15 shows the ball joint 202 as having an overall height, H2. In some embodiments, the overall height, H2, of the ball joint 202 is no greater than 6 inches, no greater than 5 inches, no greater than 4 inches, no greater than 3 inches, or no greater than 2 inches. In some embodiments, the height, H2, of the ball joint 202 is at least 2 inches, at least 3 inches, at least 4 inches, at least 5 inches, or at least 6 inches. These dimensions are merely exemplary, and it is to be appreciated that the ball joint 202 can be scaled to any suitable size, depending on the application. The example dimensions of the ball joint 202 may be suitable for battery-charging applications, such as where the joint assembly 200 (including the ball joint 202) is part of a charging station 100, as shown in FIG. 1. It is to be appreciated that the longer (in terms of the length, L2) the ball joint 202 is made, the greater range of rotational movement (e.g., pitch rotation and yaw rotation) may be achieved. Accordingly, the length, L2, of the ball joint 202 may be chosen for the desired amount of pitch rotation or yaw rotation.

The ball joint 202 may be made of any suitable material, combination of materials, or composite materials. For example, the ball joint 202 can be made of plastic, such as acetal (or Delrin), or any other suitable polymer material, such as a thermoplastic. In other embodiments, the elongate arm 104 can be made of metal, such as copper, aluminum, stainless steel, or any other suitable metallic material, or metallic coating on another type of base material. In general, any suitably rigid or semi-rigid material with relatively low friction (e.g., similar to the friction of acetal (or Delrin)) may be used to make the ball joint 202.

In some embodiments, the ball joint 202 may be manufactured using an injection molding technique, or an extrusion technique, the processes for which should be apparent to a person having ordinary skill in the art. By using an injection molding method to manufacture the ball joint 202, minimal material is used for the manufacture of the ball joint 202, thereby preventing excess waste of material. Other manufacturing techniques that may be used to manufacture the ball joint 202 include machining a material into the shape of the ball joint 202, or into component parts of the ball joint 202 that are attached together during manufacture using any suitable fastening means, such as screws, pins, joints, adhesives, or the like. Any other subtractive manufacturing techniques can be used besides machining. Additionally, additive manufacturing techniques, such as 3D printing, can be used to manufacture ball joint 202.

Figure 19:
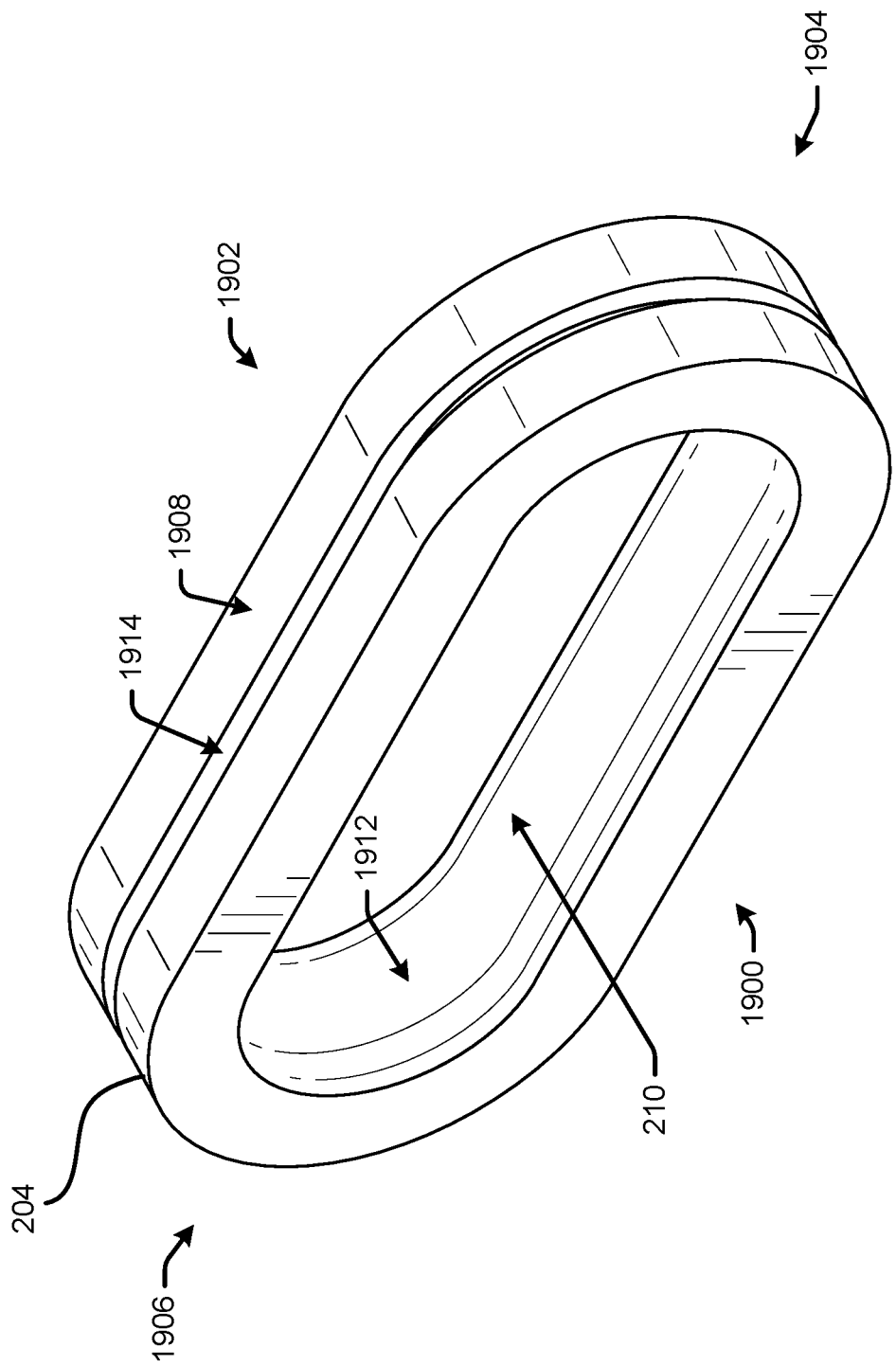
FIG. 19 illustrates a perspective view of an example carrier of the example joint assembly of FIG. 2.

FIG. 19 illustrates a perspective view of an example carrier 204 of the example compliant joint 200 of FIG. 2. FIG. 20 illustrates a front view of the example carrier 204 of FIG. 19, FIG. 21 illustrates a side view of the example carrier 204 of FIG. 19, and FIG. 22 illustrates a top view of the example carrier 204 of FIG. 19.

The carrier 204 has a front 1900, a back 1902, a first side 1904, a second side 1906, a top 1908, and a bottom 1910. The carrier 204 has a second hole 210 that is configured to receive the ball joint 202 to couple the ball joint 202 to the carrier 204. Accordingly, the shape of the second hole 210 may be similar to the shape of the cross section of the ball joint 202. In some embodiments, the ball joint 202 has a cross section that is ellipsoidal. Accordingly, the second hole 210 of the carrier 204 may also be ellipsoidal, and sized to receive the ball joint 202 therein. It is to be appreciated, however, that the second hole 210 may be of any suitable polygonal shape. The ellipsoidal shape of the second hole 210 allows for pitch rotation and yaw rotation of the ball joint 210 within the second hole 210 while preventing the ball joint 202 from rotating with roll rotation while the ball joint 202 is disposed within the second hole 210 of the carrier 204. The carrier 204 itself may also have a cross section that is ellipsoidal.

The carrier 204 may be substantially solid, the carrier 204 may be substantially hollow, or some combination (e.g., one or more cavities, conduits, or compartments may be defined within the carrier 204). The carrier 204 may have an inner surface 1912 that is concave. The concave inner surface 1912 of the carrier 204 is denoted in FIGS. 19 and 23, which shows the curvature of the concave inner surface 1912 as curving along a longitudinal axis from front-to-back, or back-to-front. This concave shape of the inner surface 1912 of the carrier 204 allows the ball joint 202 to fit, and rotate or otherwise move with pitch rotation and yaw rotation, while the ball joint 202 is disposed within a second hole 210 of the carrier 204. A first radius of curvature of the outer surface 1700 of the ball joint 202 may be substantially equal to a second radius of curvature of the inner surface 1912 of the carrier 204. As used herein, the first radius of curvature of the outer surface 1700 can be "substantially equal" to the second radius of curvature of the inner surface 1912 when they are within a tolerance of 0.5 millimeters (mm).

The carrier 204 may comprise a circumferential groove 1914 (sometimes referred to herein as a "circumferential channel 1914") defined in an outer surface of the carrier 204. The circumferential groove 1914 may be of a suitable width (or thickness) for mounting the compliant joint 200 to a structure by inserting the carrier 204 into a hole in the structure that is sized to receive the carrier 204. Such a hole in the structure may have a width and a height (assuming an ellipsoidal hole) that are slightly less than the width, W3, and the height, H3, respectively, of the carrier 204 so that a wall of the structure may fit within the circumferential groove 1914 and thereby retain the carrier 204 for mounting the carrier 204 to the structure. In an illustrative example, the base frame 108 of the charging station 100 may include a sheet metal structure with a hole that is sized to receive the carrier 204, and the carrier 204 may be inserted into (e.g., by sliding the carrier 204 into) the hole (or a slot) in the sheet metal base frame 108 without the need for any extra fasteners.

FIG. 21 further shows the carrier 204 as having an overall length, L3. In some embodiments, the overall length, L3, of the carrier 204 is no greater than 3.5 inches, no greater than 3 inches, no greater than 2 inches, no greater than 1 inch, or no greater than 0.5 inches. In some embodiments, the overall length, L3, of the carrier 204 is at least 0.5 inches, at least 1 inch, at least 2 inches, at least 3 inches, or at least 3.5 inches. FIG. 22 shows the carrier 204 as having an overall width, W3. In some embodiments, the overall width, W3, of the carrier 204 is no greater than 12 inches, no greater than 10 inches, no greater than 8 inches, no greater than 6 inches, or no greater than 4 inches. In some embodiments, the overall width, W3, of the carrier 204 is at least 4 inches, at least 6 inches, at least 8 inches, at least 10 inches, or at least 12 inches. FIG. 21 shows the carrier 204 as having an overall height, H3. In some embodiments, the overall height, H3, of the carrier 204 is no greater than 7 inches, no greater than 6 inches, no greater than 5 inches, no greater than 4 inches, or no greater than 3 inches. In some embodiments, the height, H3, of the carrier 204 is at least 3 inches, at least 4 inches, at least 5 inches, at least 6 inches, or at least 7 inches. These dimensions are merely exemplary, and it is to be appreciated that the carrier 204 can be scaled to any suitable size, depending on the application. The example dimensions of the carrier 204 may be suitable for battery-charging applications, such as where the joint assembly 200 (including the carrier 204) is part of a charging station 100, as shown in FIG. 1. It is to be appreciated that the longer (in terms of the length, L3) the carrier 204 is made, the greater range of rotational movement (e.g., pitch rotation and yaw rotation) may be achieved for the ball joint 202. Accordingly, the length, L3, of the carrier 204 may be chosen for the desired amount of pitch rotation or yaw rotation. The overall length, L3, of the carrier 204 may be less than the overall length, L2, of the ball joint 202, and, hence, the overall length, L2, of the ball joint 202 may be greater than the overall length, L3, of the carrier 204. This relationship between the respective lengths, L2 and L3, prevents the elongate arm 104 from "bottoming out" on the carrier 204 during pitch rotation or yaw rotation of the ball joint 202 within the carrier 204.

The carrier 204 may be made of any suitable material, combination of materials, or composite materials. For example, the carrier 204 can be made of plastic, such as acetal (or Delrin), or any other suitable polymer material, such as a thermoplastic. In other embodiments, the carrier 204 can be made of metal, such as copper, aluminum, stainless steel, or any other suitable metallic material, or metallic coating on another type of base material. In general, any suitably rigid or semi-rigid material with relatively low friction (e.g., similar to the friction of acetal (or Delrin)) may be used to make the carrier 204.

In some embodiments, the carrier 204 may be manufactured using an injection molding technique, or an extrusion technique, the processes for which should be apparent to a person having ordinary skill in the art. By using an injection molding method to manufacture the carrier 204, minimal material is used for the manufacture of the carrier 204, thereby preventing excess waste of material. Other manufacturing techniques that may be used to manufacture the carrier 204 include machining a material into the shape of the carrier 204, or into component parts of the carrier 204 that are attached together during manufacture using any suitable fastening means, such as screws, pins, joints, adhesives, or the like. Any other subtractive manufacturing techniques can be used besides machining. Additionally, additive manufacturing techniques, such as 3D printing, can be used to manufacture carrier 204. Notably, either or both of the ball joint 202 and carrier 204 can each be manufactured as a single monolithic piece/part, and then the joint assembly 200 can be assembled together thereafter, such as by using the process 2400 described in detail below. For example, the ball joint 202 and the carrier 204 can be injection molded independently, and then the ball joint 202 can fit into the carrier 204. This eliminates the need to manufacture the carrier 204 as two separate pieces that are joined together around the ball joint 202.

Figure 23:
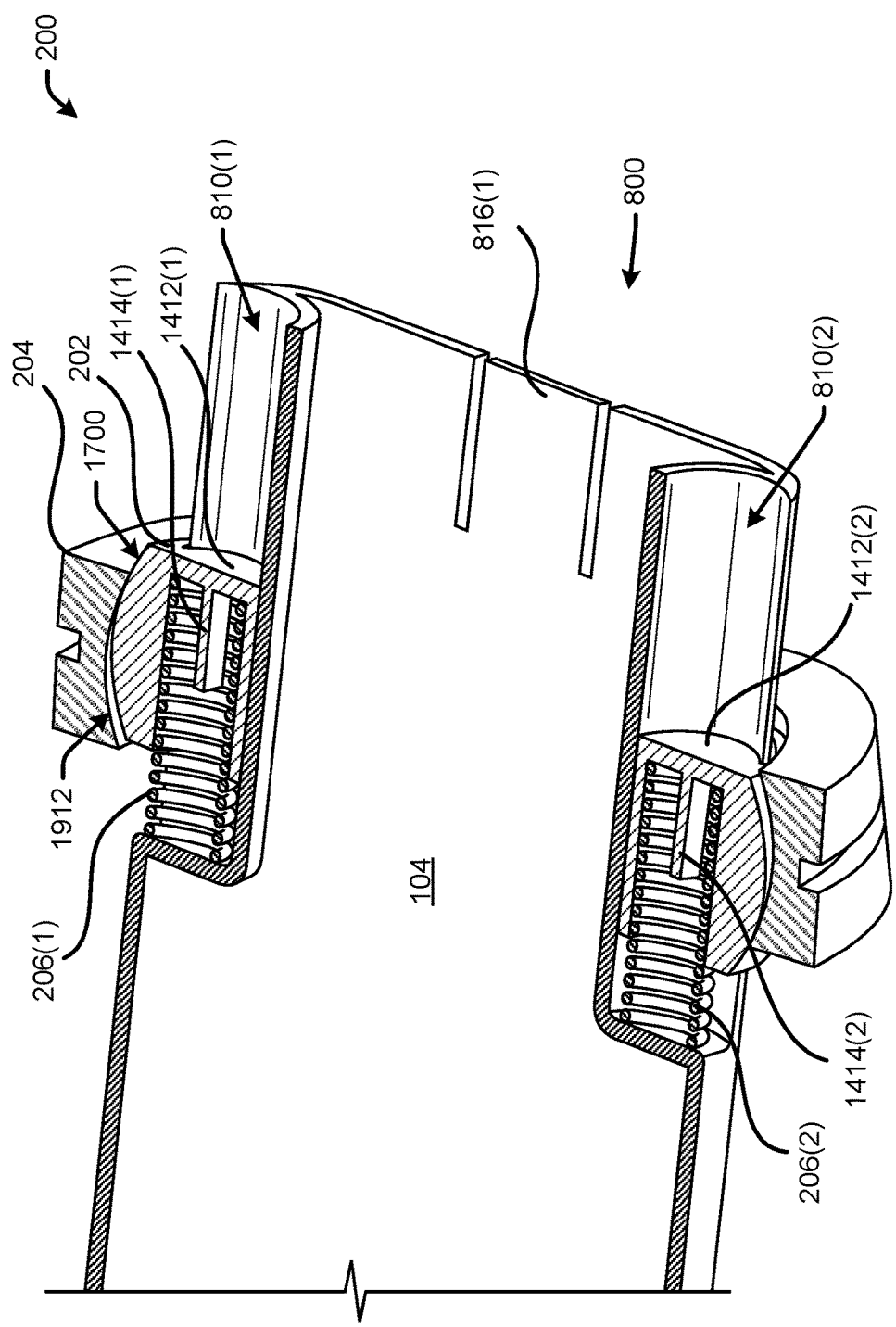
FIG. 23 illustrates a partial cross-sectional view of the example compliant joint of FIG. 4, taken along section line A-A.

FIG. 23 illustrates a partial cross-sectional view of the example compliant joint 200 of FIG. 4, taken along section line A-A. FIG. 23 illustrates the concave shape of the inner surface 1912 of the carrier 204 that accommodates the convex shape of the outer surface 1700 of the ball joint 202. This coupling relationship of the ball joint 202 and the carrier 204 allows for the pitch rotation and yaw rotation of the ball joint 202 within the carrier 204, as described herein. Additionally, the elongate arm 104 may move axially through the first hole 208 of the ball joint 202 to round out the three DOF in which the joint assembly 200 is movable.

The first biasing member 206(1) (e.g., a spring) is shown as being disposed within the first groove 810(1) of the elongate arm 104. When the first biasing member 206(1) is disposed in the first groove 810(1), a first end of the first biasing member 206(1) abuts the elongate arm 104, and a second end of the first biasing member 206(1) abuts, or is coupled to, the ball joint 202 at the first retention feature 1412(1). For example, the first biasing member 206(1) may fit over (or around) a first cross projection 1414(1) at a back of the cylindrical recess or cavity defined in the first retention feature 1412(1). Similarly, when the second biasing member 206(2) is disposed in the second groove 810(2), a first end of the second biasing member 206(2) abuts the elongate arm 104, and a second end of the second biasing member 206(2) abuts, or is coupled to, the ball joint 202 at the second retention feature 1412(2). For example, the second biasing member 206(2) may fit over (or around) a second cross projection 1414(2) at a back of the cylindrical recess or cavity defined in the second retention feature 1412(2). The first biasing member 206(1) and the second biasing member 206(2) axially bias the elongate arm 104 in an extended state in the absence of an axial 400 force applied along the longitudinal axis 402 of the elongate arm 104. FIG. 23 depicts the elongate arm 104 in at least a partially compressed state where the biasing members 206 are compressed. When the elongate arm 104 is in the extended state (e.g., in the absence of an axial 400 force), the tab 816(1) of the elongate arm 104 (and specifically the projection extending from the tab 816(1)) abuts a back edge of the ball joint 202, which is the edge of the ball joint 202 that is closest to the proximal end 800 of the elongate arm 104. Notably, the tab 816(1) does not abut the carrier 204 when the elongate arm 104 is in the extended state, which allows for pitch rotation and yaw rotation of the ball joint 202 within the carrier 204. Although not shown in FIG. 23, the second tab 816(2) similarly abuts the back edge of the ball joint 202 when the elongate arm 104 is in the extended state. In some embodiments, the biasing members 206 are configured to return the elongate arm 104 to a resting position (or, original position, nominal position, etc.) in the absence of any external forces applied to the elongate arm 104. Accordingly, when the joint assembly 200 is implemented as part of a charging station 100, the elongate arm 104 may return to such a resting position whenever docked device de-docks from the charging station 100.

The processes described herein are illustrated as a collection of blocks in a logical flow graph, which represent a sequence of operations. The order in which the operations are described is not intended to be construed as a limitation, and any number of the described blocks can be combined in any order and/or in parallel to implement the processes.

Figure 24:
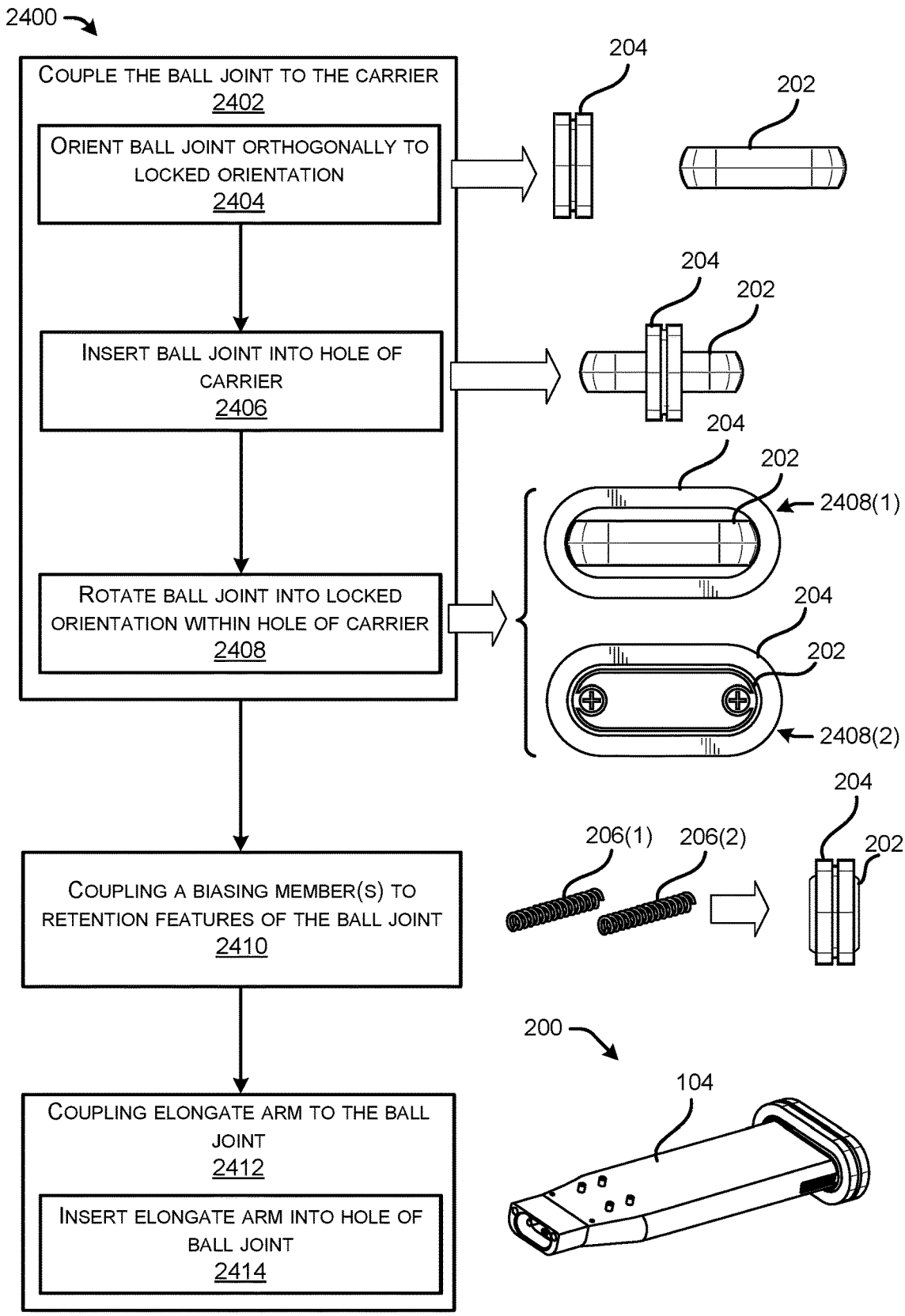
FIG. 24 illustrates a flow diagram of an example process for assembling the example compliant joint of FIG. 2, according to embodiments disclosed herein.

FIG. 24 illustrates a flow diagram of an example process 2400 for assembling the example compliant joint 200 of FIG. 2, according to embodiments disclosed herein. For discussion purposes, the process 2400 is described with reference to the previous figures.

At 2402, the ball joint 202 may be coupled to the carrier 204. As shown by sub-blocks 2404-2408, the coupling of the ball joint 202 to the carrier 204 may involve multiple operations.

At 2404, the ball joint 202 may be oriented substantially orthogonal to a locked orientation of the ball joint 202 when the ball joint 202 is coupled to the carrier 204. That is, the ball joint 202 may be oriented in a first orientation (shown pictorially in FIG. 24 directly to the right of sub-block 2404). This first orientation of the ball joint 202 may be substantially orthogonal to a second orientation of the ball joint 202 (shown pictorially in FIG. 24 at 2408(2), directly to the right of sub-block 2408) when the ball joint 202 is coupled to the carrier 204.

At 2406, the ball joint 202 may be inserted into the second hole 210 of the carrier 204 while the ball joint 202 is oriented in the first orientation. This is shown pictorially in FIG. 24 directly to the right of sub-block 2406.

At 2408, the ball joint 202 may be rotated from the first orientation (at 2406) to the second (locked) orientation (at 2408(2)). This may be accomplished by rotating the ball joint 202 about 90 degrees with yaw rotation (which results in the intermediate orientation at 2408(1)), and subsequently about 90 degrees with pitch rotation (which results in the second (locked) orientation at 2408(2)). These rotation maneuvers lock the ball joint 202 into the second (locked) orientation in order to couple the ball joint 202 to the carrier 204, after which the ball joint 202 is disposed within the second hole 210 of the carrier 204 (as shown pictorially in FIG. 24 directly to the right of sub-block 2408, at 2408(2)).

At 2410, at least one biasing member 206 may be coupled to at least one retention feature 1412 of the ball joint 202 (as shown pictorially in FIG. 24 directly to the right of block 2410). For example, the pair of biasing members 206(1) and 206(2) (e.g., compression springs) may be attached to the pair of retention features 1412(1) and 1412(2) of the ball joint 202 by pressing the biasing members 206 over (or around) the cross projections 1414 of the retention features 1412.

At 2412, the elongate arm 104 may be coupled to the ball joint 202. As shown by sub-blocks 2414, the coupling of the elongate arm 104 to the ball joint 202 may comprise inserting a proximal end 800 of the elongate arm 104 into the first hole 208 of the ball joint 202 until a tab(s) 816 at the proximal end 800 passes beyond a back edge of the ball joint 202. The fully assembled joint 200 is shown pictorially in FIG. 24 directly to the right of block 2412. Once the elongate arm 104 is coupled to the ball joint 202, the ball joint 202 is prevented from decoupling from the carrier 204, which preserves the integrity of the assembled joint 200.

The joint assembly 200 may be sold as a kit of separate component parts (e.g., as shown in FIG. 2), or as an assembled joint (e.g., as shown in FIG. 3). Accordingly, a "joint assembly," as used herein, may be the unassembled form of the joint assembly, as depicted in FIG. 2, or it may be the assembled form of the joint assembly, as depicted in FIG. 3.

Unless otherwise indicated, all numbers expressing quantities used in the specification and claims are to be understood as being modified in all instances by the term "about."

Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. When further clarity is required, the term "about" has the meaning reasonably ascribed to it by a person skilled in the art when used in conjunction with a stated numerical value or range, i.e. denoting somewhat more or somewhat less than the stated value or range, to within a range of ±20% of the stated value; ±19% of the stated value; ±18% of the stated value; ±17% of the stated value; ±16% of the stated value; ±15% of the stated value; ±14% of the stated value; ±13% of the stated value; ±12% of the stated value; ±11% of the stated value; ±10% of the stated value; ±9% of the stated value; ±8% of the stated value; ±7% of the stated value; ±6% of the stated value; ±5% of the stated value; ±4% of the stated value; ±3% of the stated value; ±2% of the stated value; or ±1% of the stated value.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A compliant joint comprising:
an elongate arm having a first cross section that is ellipsoidal, the elongate arm comprising a proximal end and a distal end;
a ball joint coupled to the elongate arm, the ball joint having a second cross section that is ellipsoidal and comprising:
an outer surface that is convex; and
a first hole that is ellipsoidal,
wherein the ball joint is coupled to the elongate arm by the elongate arm being disposed within the first hole, the elongate arm configured to move axially through the first hole in response to an axial force applied to the elongate arm; and
a carrier coupled to the ball joint, the carrier comprising:
a second hole that is ellipsoidal; and
an inner surface that is concave,
wherein the carrier is coupled to the ball joint by the ball joint being disposed within the second hole, the ball joint configured to move within the second hole with pitch rotation or with yaw rotation in response to a transverse force applied to the elongate arm.

2. The compliant joint of claim 1, wherein:
the elongate arm further comprises:
a first side;
a second side;
a first groove defined in the first side at the proximal end; and
a second groove defined the second side at the proximal end;
the ball joint further comprises:
a first retention feature that extends into the first hole from a second inner surface of the ball joint, the first retention feature axially aligned with the first groove; and
a second retention feature that extends into the first hole from the second inner surface of the ball joint, the second retention feature axially aligned with the second groove; and
the compliant joint further comprises:
a first spring disposed within the first groove, a first end of the first spring abutting the elongate arm, and a second end of the first spring coupled to the first retention feature; and
a second spring disposed within the second groove, a first end of the second spring abutting the elongate arm, and a second end of the second spring coupled to the second retention feature,
wherein the first spring and the second spring bias the elongate arm in an extended state in an absence of the axial force.

3. The compliant joint of claim 2, wherein:
the elongate arm further comprises:
a first tab at the proximal end on a top of the elongate arm, wherein the first tab comprises a first projection extending in an upward direction from the top; and
a second tab at the proximal end on a bottom of the elongate arm, wherein the second tab comprises a second projection extending in a downward direction from the bottom;
the first tab and the second tab are each configured to deflect toward a center of the elongate arm; and
the first projection and the second projection abut a back edge of the ball joint when the elongate arm is biased in the extended state.

4. The compliant joint of claim 1, wherein the carrier further comprises a circumferential groove defined in a second outer surface of the carrier for mounting the compliant joint to a structure.

5. The compliant joint of claim 1, wherein the elongate arm further comprises a charge adapter at the distal end for charging an autonomous electronic device, and wherein the compliant joint is part of a charging station.

6. A system comprising:
an elongate arm;
a ball joint having a cross section that is ellipsoidal and comprising:
an outer surface that is convex; and
a first hole,
wherein the elongate arm is configured to be disposed within the first hole and is configured to move axially through the first hole in response to an axial force applied to the elongate arm; and
a carrier comprising:
a second hole that is ellipsoidal; and
an inner surface that is concave,
wherein the ball joint is configured to be disposed within the second hole and is configured to move within the second hole with at least one of pitch rotation or yaw rotation in response to a transverse force applied to the elongate arm.

7. The system of claim 6, wherein the ball joint is movable within the second hole with the pitch rotation and with the yaw rotation.

8. The system of claim 6, wherein:
the elongate arm further comprises:
a proximal end;
a distal end;
a first side;
a second side;
a first groove defined in the first side at the proximal end; and
a second groove defined in the second side at the proximal end;
the ball joint further comprises:
a first retention feature configured to axially align with the first groove; and
a second retention feature configured to axially align with the second groove; and
the system further comprises:
a first biasing member disposed within the first groove; and
a second biasing member disposed within the second groove,
wherein the first biasing member and the second biasing member are configured to bias the elongate arm in an extended state.

9. The system of claim 6, wherein the elongate arm further comprises at least one tab at a proximal end of the elongate arm, the at least one tab configured to lock the elongate arm in a coupled engagement with the ball joint.

10. The system of claim 9, wherein the at least one tab is a first tab on a top of the elongate arm, the elongate arm further comprises a second tab on a bottom of the elongate arm, and the second tab is configured to lock the elongate arm in the coupled engagement with the ball joint.

11. The system of claim 6, wherein the carrier further comprises a circumferential groove defined in an outer surface of the carrier.

12. The system of claim 6, wherein the elongate arm further comprises a charge adapter at a distal end of the elongate arm.

13. The system of claim 6, wherein:
the ball joint has a first length measured from a front of the ball joint to a back of the ball joint;
the carrier has a second length measured from a front of the carrier to a back of the carrier; and
the first length is greater than the second length.

14. The system of claim 6, wherein a first radius of curvature of the outer surface of the ball joint is substantially equal to a second radius of curvature of the inner surface of the carrier.

15. The system of claim 6, wherein:
the elongate arm has a cross section that is ellipsoidal; and
the first hole of the ball joint is ellipsoidal.

16. The system of claim 6, wherein the elongate arm is tapered at a distal end of the elongate arm.

* * * * *